United States Patent
Tasaka et al.

(10) Patent No.: US 7,978,295 B2
(45) Date of Patent: Jul. 12, 2011

(54) LIQUID CRYSTAL DISPLAY AND METHOD FOR MANUFACTURING SAME

(75) Inventors: Yasutoshi Tasaka, Minato-ku (JP); Mutsumi Nakajima, Nara (JP); Masayuki Inoue, Arlington Heights, IL (US); Keisuke Yoshida, Matsusaka (JP); Hirofumi Katsuse, Bunkyo-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 125 days.

(21) Appl. No.: 11/992,522

(22) PCT Filed: Jun. 21, 2006

(86) PCT No.: PCT/JP2006/312393
§ 371 (c)(1),
(2), (4) Date: Feb. 3, 2009

(87) PCT Pub. No.: WO2007/039967
PCT Pub. Date: Apr. 12, 2007

(65) Prior Publication Data
US 2009/0219476 A1 Sep. 3, 2009

(30) Foreign Application Priority Data
Sep. 30, 2005 (JP) .................................. 2005-289428

(51) Int. Cl.
G02F 1/1345 (2006.01)
G02F 1/1337 (2006.01)
(52) U.S. Cl. ........................................ 349/144; 349/129
(58) Field of Classification Search .................. 349/144, 349/129
See application file for complete search history.

(56) References Cited

U.S. PATENT DOCUMENTS

| | | | | |
|---|---|---|---|---|
| 6,738,120 | B1 * | 5/2004 | Song et al. | 349/139 |
| 7,379,135 | B2 * | 5/2008 | Lin et al. | 349/114 |
| 7,408,606 | B2 * | 8/2008 | Shih | 349/129 |
| 7,671,951 | B2 * | 3/2010 | Choi et al. | 349/129 |
| 2001/0024257 | A1 | 9/2001 | Kubo et al. | |

(Continued)

FOREIGN PATENT DOCUMENTS

CN 1351277 A 5/2002

(Continued)

OTHER PUBLICATIONS

EP Search Report mailed Jan. 13, 2009 in corresponding EP application 06767052.1.

(Continued)

*Primary Examiner* — Uyen-Chau N Le
*Assistant Examiner* — Chris H Chu
(74) *Attorney, Agent, or Firm* — Nixon & Vanderhye P.C.

(57) ABSTRACT

A vertically aligned system liquid crystal display in which deterioration in display quality such as graininess, burn-in, afterimages due to disorder in orientation of liquid crystal molecules based on a connection electrodes for interconnecting sub-pixel electrodes can be prevented, and a method for manufacturing such liquid crystal display. In the liquid crystal display, each pixel electrode (2) of a liquid crystal panel is constituted by combining at least two sub-pixel electrodes (2a), and each sub-pixel electrode (2a) is connected through a bridge (3) narrower than the sub-pixel electrode (2a). A vertically aligned system in which liquid crystal molecules tilt symmetrically to the central axis of orientation in the direction perpendicular to the surface of each sub-pixel electrode (2a) upon application of a voltage is employed. The bridge (3) is provided at a position asymmetric to the sub-pixel electrode (2a).

3 Claims, 17 Drawing Sheets

U.S. PATENT DOCUMENTS

| | | |
|---|---|---|
| 2002/0036740 A1 | 3/2002 | Kubo et al. |
| 2002/0036744 A1 | 3/2002 | Kubo et al. |
| 2002/0075436 A1 | 6/2002 | Kubo et al. |
| 2004/0041770 A1 | 3/2004 | Kubo et al. |
| 2004/0141133 A1 | 7/2004 | Sonoda et al. |
| 2004/0150764 A1 | 8/2004 | Kubo et al. |
| 2004/0155998 A1 | 8/2004 | Kubo et al. |
| 2004/0201810 A1 | 10/2004 | Kubo et al. |
| 2004/0207790 A1 | 10/2004 | Song et al. |
| 2004/0233360 A1* | 11/2004 | Yoshida et al. ............... 349/114 |
| 2005/0206795 A1* | 9/2005 | Shin et al. ..................... 349/43 |
| 2005/0243259 A1 | 11/2005 | Song et al. |
| 2006/0038946 A1 | 2/2006 | Yoshida et al. |
| 2006/0044501 A1 | 3/2006 | Mizusako |
| 2006/0139541 A1 | 6/2006 | Yamaguchi et al. |
| 2006/0278874 A1 | 12/2006 | Kubo et al. |
| 2007/0081116 A1 | 4/2007 | Song et al. |
| 2007/0139594 A1 | 6/2007 | Kubo et al. |
| 2008/0143940 A1 | 6/2008 | Yoshida et al. |
| 2010/0007834 A1 | 1/2010 | Song et al. |
| 2010/0157182 A1 | 6/2010 | Kubo et al. |

FOREIGN PATENT DOCUMENTS

| | | |
|---|---|---|
| CN | 1758119 A | 4/2006 |
| CN | 1794065 A | 6/2006 |
| EP | 0 884 626 A2 | 12/1998 |
| EP | 1 091 238 A2 | 4/2001 |
| JP | 2002-55343 | 2/2002 |
| JP | 2002-122886 | 4/2002 |
| JP | 2004-177788 | 6/2004 |
| JP | 2004-302174 | 10/2004 |
| JP | 2004-302195 | 10/2004 |
| JP | 2005-215352 | 8/2005 |
| JP | 2005-241859 | 9/2005 |
| KR | 2001-0035578 A | 5/2001 |
| KR | 10-2004-0026039 | 3/2004 |

OTHER PUBLICATIONS

International Search Report for PCT/JP2006/312393 mailed Jul. 18, 2006.

* cited by examiner

FIG. 2(a)
(PIXEL STRUCTURE)
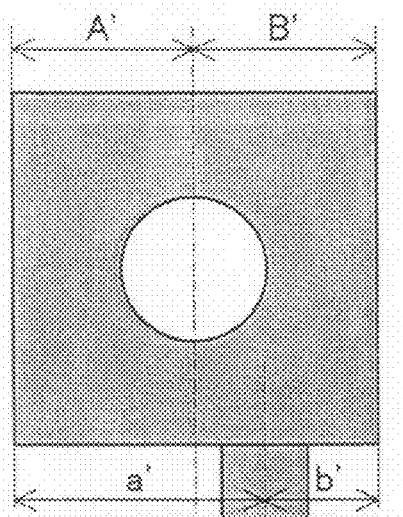
$A' = B'$
$a' \neq b'$
$a' = a + x$
$b' = b - x$
OFFSET AMOUNT OF BRIDGE x
FIG. 2(b)
(ORIENTATION MAPPING)
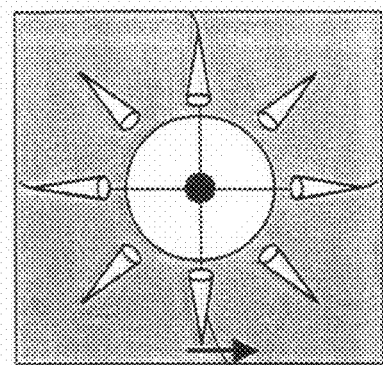
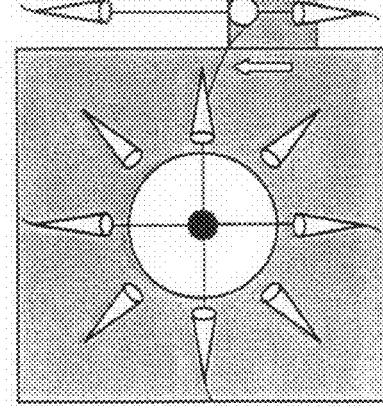

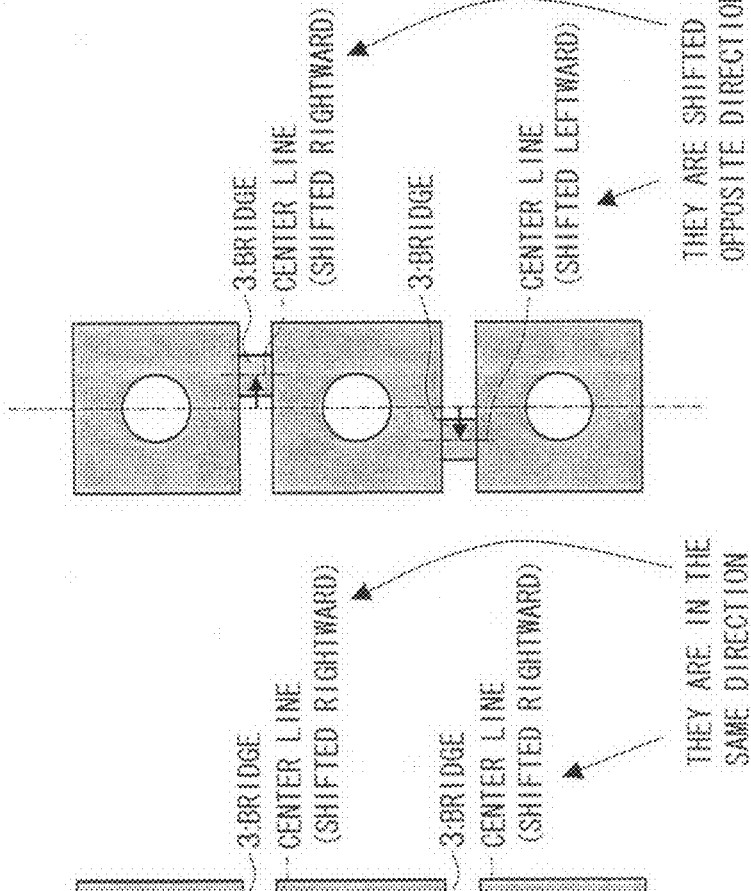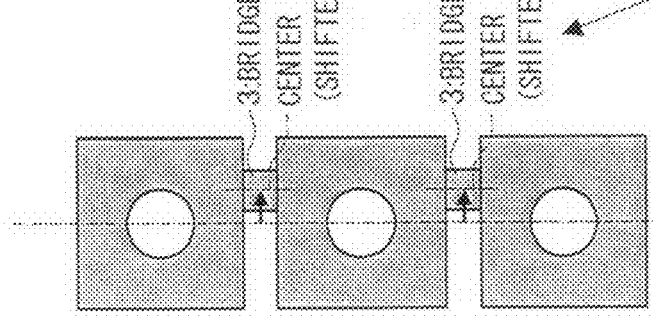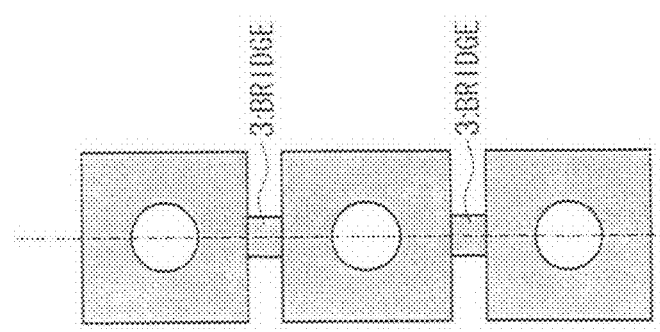

F I G. 7 (a)
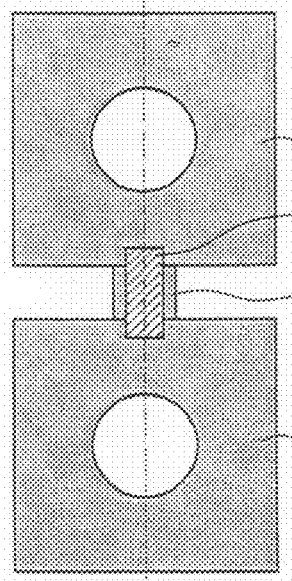
- 2a
- 31:METAL ELECTRODE
- 3:BRIDGE
CENTER LINE OF SUBPIXEL ELECTRODE
(THIS CENTER LINE MATCHES THAT OF BRIDGE)
F I G. 7 (b)
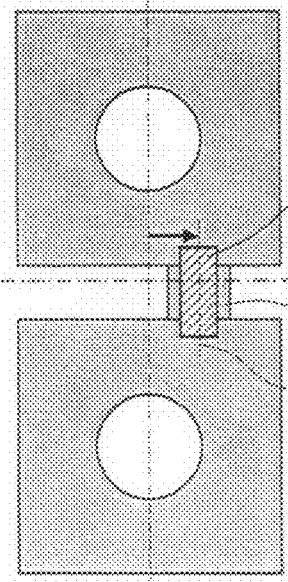
- 31:METAL ELECTRODE
- B
- 3:BRIDGE
- CENTER LINE OF BRIDGE AND CENTER LINE OF METAL ELECTRODE (THOSE CENTER LINES MATCH THAT OF SUBPIXEL ELECTRODE)
- CENTER LINE OF SUBPIXEL ELECTRODE (THIS CENTER LINE DOES NOT MATCH THAT OF BRIDGE)
F I G. 7 (c)
31
3:BRIDGE FIG. 11 (a)
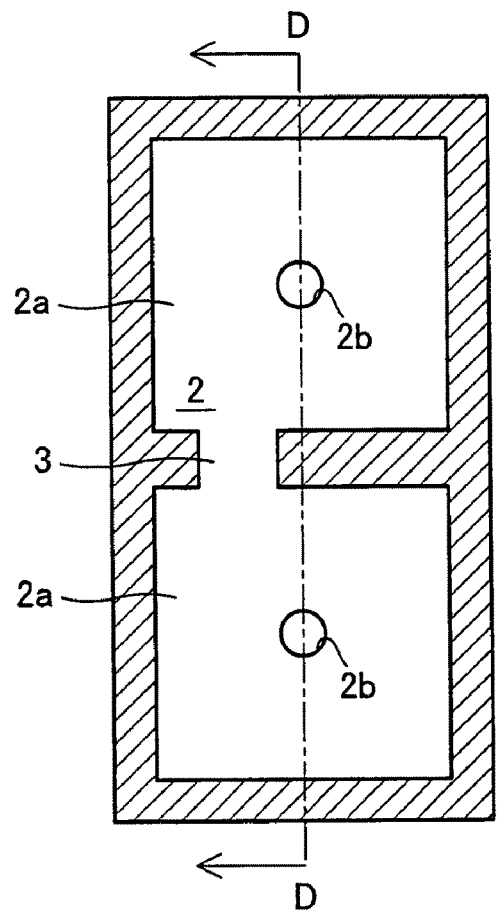
FIG. 11 (b)
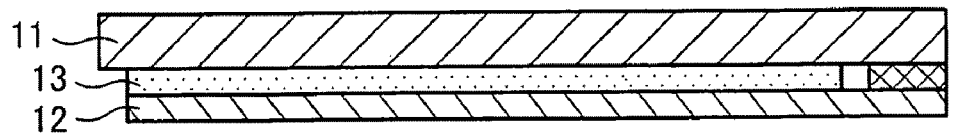
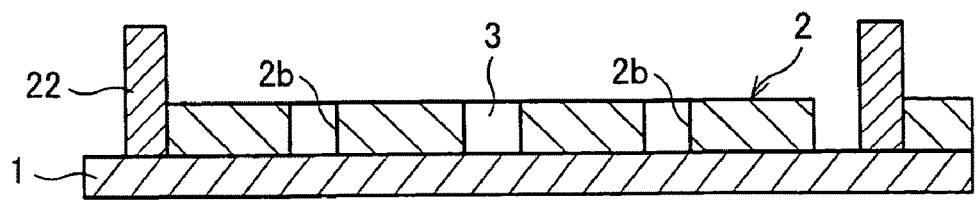

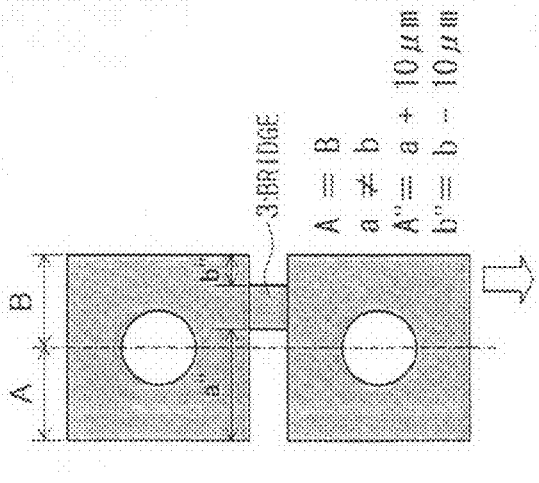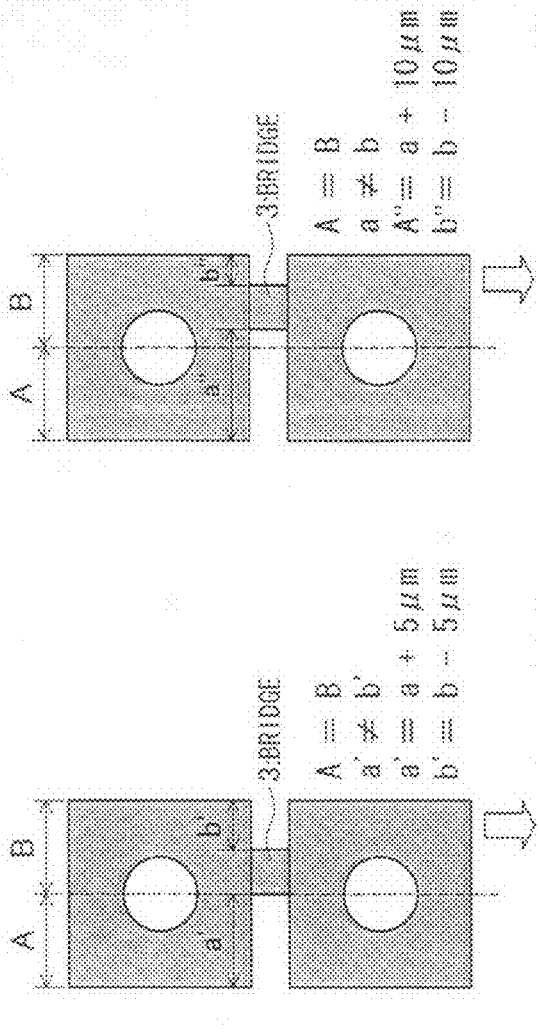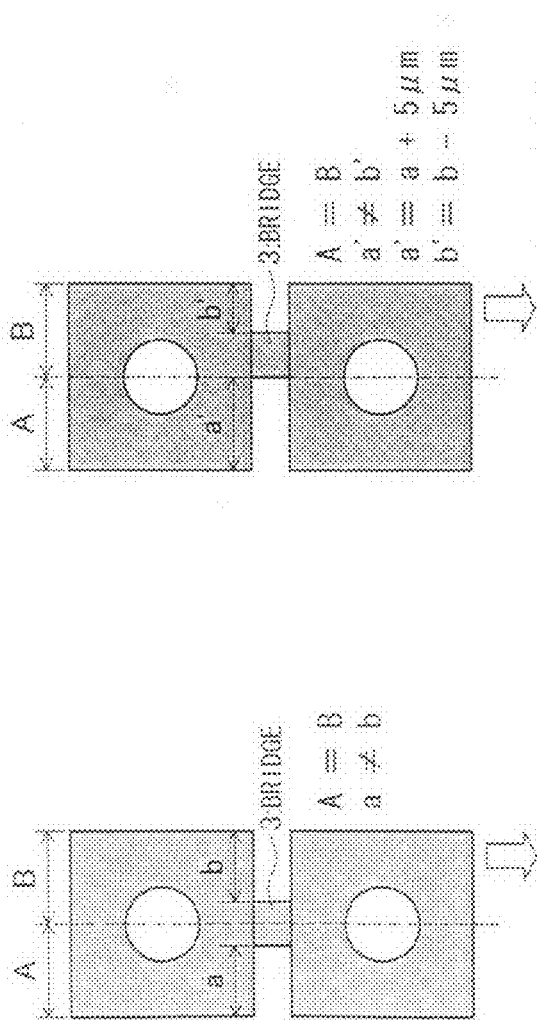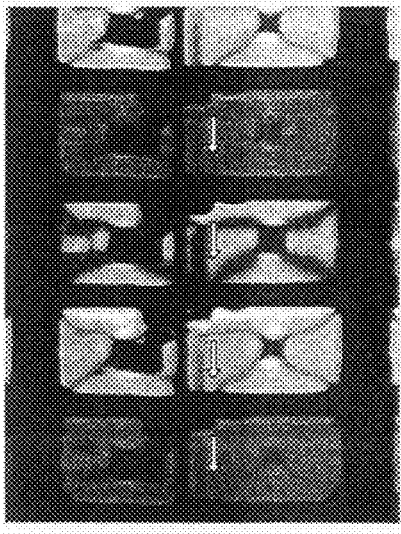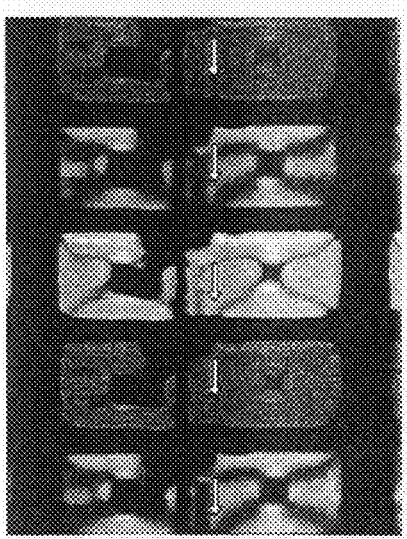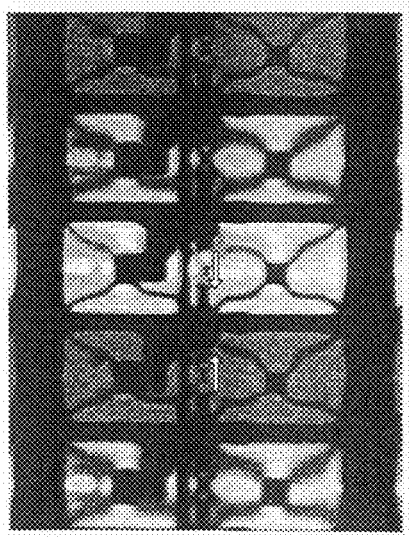
FIG. 13(a) CONVENTIONAL EXAMPLE
A = B
a ≠ b
FIG. 13(b) BRIDGE IS SHIFTED BY 5 μm FROM CURRENT POSITION
A = B
a' ≠ b'
a' = a + 5 μm
b' = b − 5 μm
FIG. 13(c) BRIDGE IS SHIFTED BY 10 μm FROM CURRENT POSITION
A = B
a' ≠ b'
a' = a + 10 μm
b' = b − 10 μm

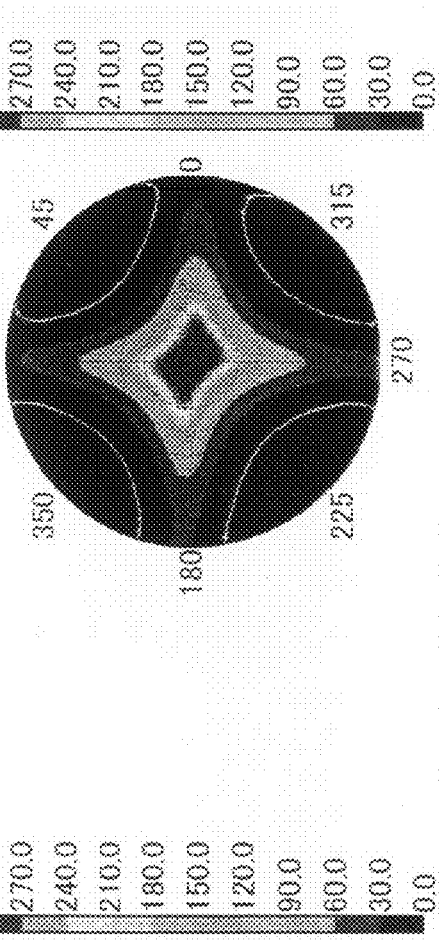
FIG. 15(b) CENTRAL AXES OF THE BRIDGES ARE ARRANGED SO AS TO PRODUCE A CHECKERED PATTERN
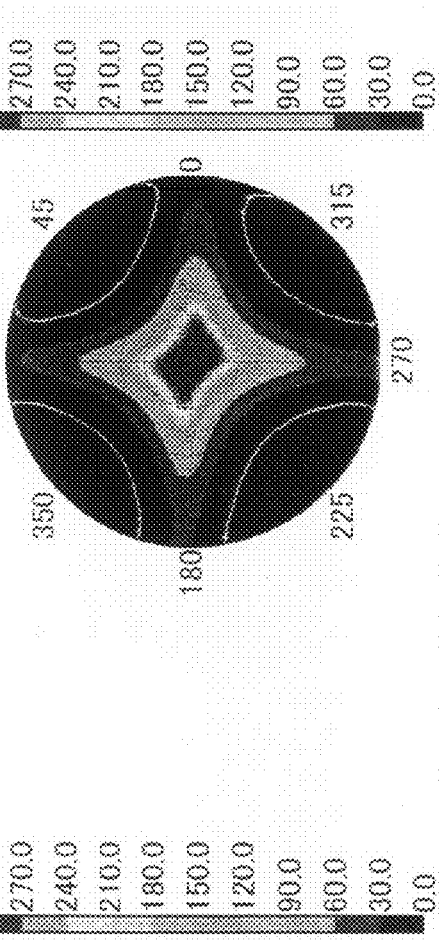
FIG. 15(a) THE CENTRAL AXIS OF EACH BRIDGE IS SHIFTED BY 10μm RIGHTWARD FROM RESPECTIVE CENTRAL AXIS OF THE SUBPIXEL ELECTRODES
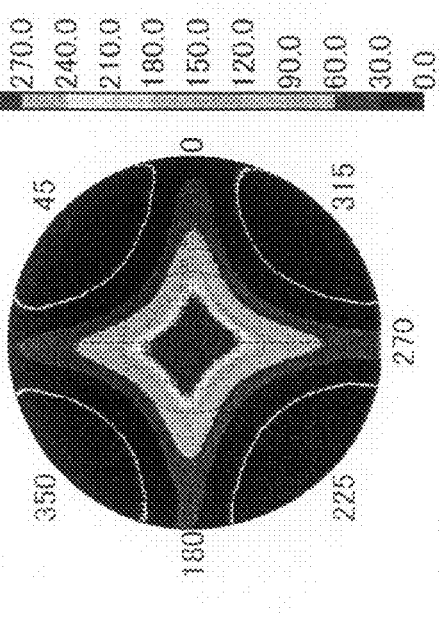
FIG. 15(c) CONVENTIONAL EXAMPLE
FIG. 15(d) VISUAL ANGLE AT WHICH CR > 10
| | EXAMPLE 2 | EXAMPLE 5 | CONVENTIONAL EXAMPLE |
|---|---|---|---|
| 0 | >80° | >80° | >80° |
| 45 | 44° | 45° | 46° |
| 90 | >80° | >80° | >80° |
| 135 | 49° | 50° | 49° |
| 180 | >80° | >80° | >80° |
| 225 | 46° | 46° | 47° |
| 270 | >80° | >80° | >80° |
| 315 | 46° | 48° | 48° |
| 360 | >80° | >80° | >80° |

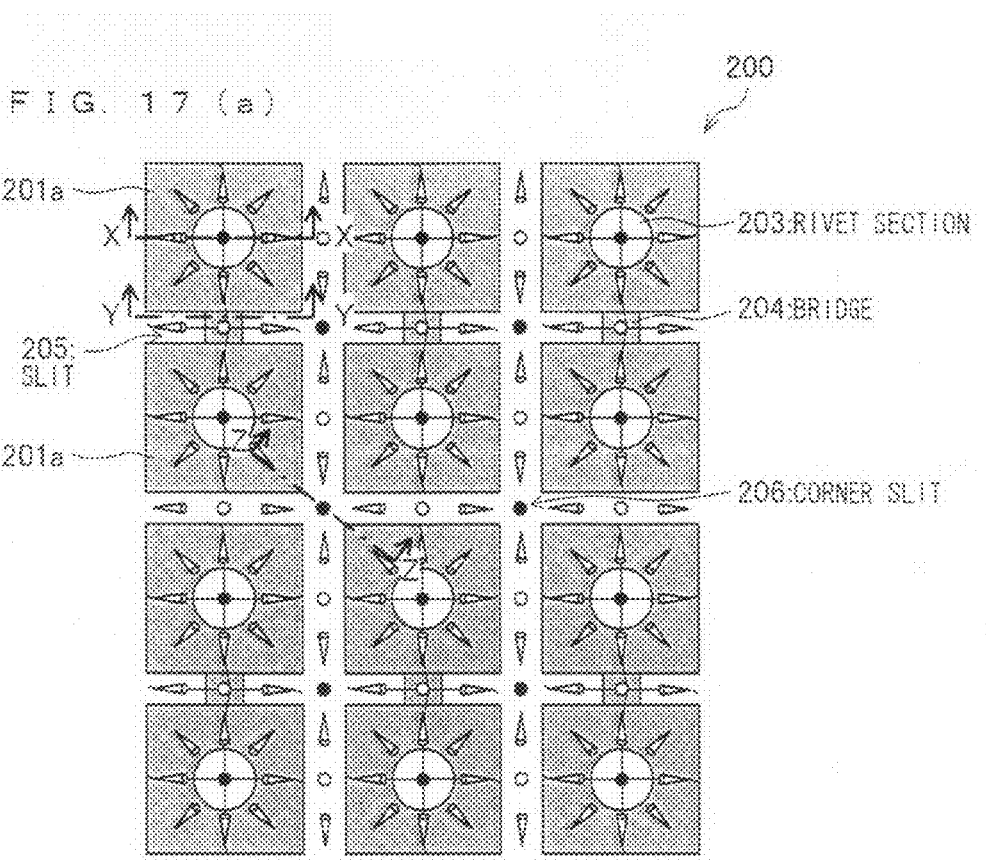
FIG. 17 (a)
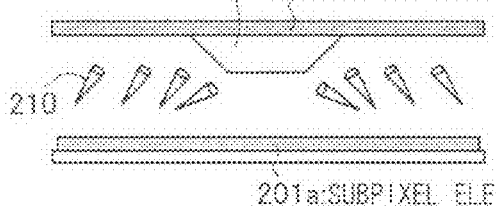
FIG. 17 (b)
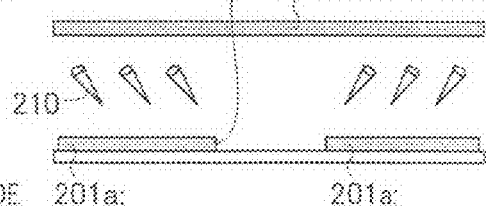
FIG. 17 (d)
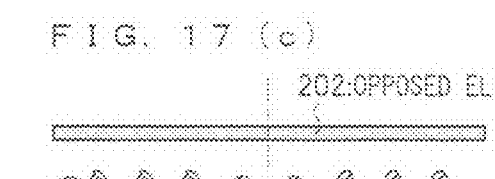
FIG. 17 (c)
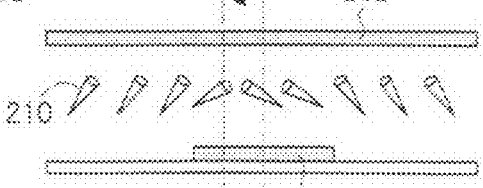
FIG. 17 (e)

US 7,978,295 B2

LIQUID CRYSTAL DISPLAY AND METHOD FOR MANUFACTURING SAME

This application is the U.S. national phase of International Application No. PCT/JP2006/312393 filed 21 Jun. 2006 which designated the U.S. and claims priority to Japanese Patent Application No. 2005-289428 filed 30 Sep. 2005, the entire contents of each of which are hereby incorporated by reference.

TECHNICAL FIELD

The present invention relates to a liquid crystal display device of a vertically aligned system, including a liquid crystal panel having a pixel electrode constituted of a combination of at least two subpixel electrodes connected together via a connecting electrode narrower than either one of the subpixel electrodes, and liquid crystal molecules tilting, when voltage is applied, axially symmetrically to a predetermined orientational central axis perpendicular to a surface of the subpixel electrodes. The present invention also relates to a method of producing the liquid crystal display device.

BACKGROUND ART

Conventionally, TN (Twisted Nematic) type liquid crystal display devices have widely been used as liquid crystal display devices. Liquid crystal layers of the TN type liquid crystal display devices are arranged in such a manner that two alignment layers, upper and lower alignment layers, are made different in rubbing directions so that liquid crystal molecules are in a twisted state (twisted orientation) when no voltage is applied. Display quality of the TN mode liquid crystal display devices largely depends on visual angles.

In view of the foregoing circumstance, there has been proposed a vertically aligned (VA) mode system for the TN mode liquid crystal display devices. The VA mode system uses a liquid crystal material having negative dielectric anisotropy and a vertical alignment layer. In the VA mode, a black display is carried out in a state in which no voltage is applied. Birefringence due to liquid crystal layers of vertical alignment in a state in which no voltage is applied is mostly compensated with the use of a phase difference plate having a negative anisotropy refractive index or the like, whereby a suitable black display is obtainable in very wide visual angle directions. It is therefore possible to produce a display having high contrast in wide visual angle directions.

An exemplary device of the liquid crystal display devices of the vertically aligned (VA) system is disclosed in Patent Literature 1.

In this liquid crystal display device 100, a pixel electrode 101 has subpixel electrodes 101a, 101a, 101a, as shown in FIG. 16(a). An opposed electrode 102, which faces the pixel electrode 101, has rivet sections 103 that are in the shape of a protrusion and are provided at respective central parts of the subpixel electrodes 101a . . . , as shown in FIG. 16(b).

The foregoing makes it possible to tilt an electric field generated perpendicularly on an electrode surface between the subpixel electrodes 101a . . . and the opposed electrode 102. Thus, when voltage is applied, the liquid crystal molecules tilt axially symmetrically in the vertically aligned mode. Thus, visual angle dependency is equalized, compared with a case in which the liquid crystal molecules tilt only in a single direction. Therefore, a very fine visual angle characteristic is obtainable in all directions.

[Patent Literature 1] Japanese Unexamined Patent Publication No. 2005-215352 (published on Apr. 21, 2005)

[Patent Literature 2] Japanese Unexamined Patent Publication No. 2001-109009 (published on Apr. 20, 2001)

DISCLOSURE OF INVENTION

Meanwhile, as shown in FIG. 16(a), center positions of bridges 104, which are connecting electrodes connecting the plural subpixel electrodes 101a . . . , in the conventional liquid crystal display devices match those of the subpixel electrodes 101a and those of the rivet sections 103 . . . , producing a symmetrical appearance.

With this arrangement, however, electric field effect of the bridges 104 and orientation restraining force of the rivet sections 103 . . . both become symmetric, and the bridges 104 have a width. This gives rise to a phenomenon that orientational central axes of liquid crystal molecules that are formed there are shifted to either right ends or left ends of the bridges 104. The direction in which the orientational central axes are shifted is not controllable with a conventional design. Therefore, there is a problem that the foregoing causes deterioration in display quality, such as graininess, burn-in, afterimages and the like.

The following describes this problem, with reference to orientations of liquid crystal molecules in a liquid crystal display device 200, which is similar to Patent Literature 1 mentioned above, as shown in FIGS. 17(a), 17(b), and 17(c). The liquid crystal display device 200 differs from the liquid crystal display device 100 in that each subpixel electrode 201a of the liquid crystal display device 200 is a quadrangle whereas each of the subpixel electrodes 101a of the liquid crystal display device 100 is a hexagon.

As shown in FIG. 17(a), the liquid crystal display device 200 has the subpixel electrodes 201a . . . , and rivet sections 203, each of which is in the shape of a protrusion, are provided to an opposed electrode 202 such that the rivet sections 203 face central parts of the subpixel electrodes 201a . . . , respectively. Further, bridges 204 are provided between the subpixel electrodes 201a . . . to connect the plural subpixel electrodes 201a . . . , and respective center positions of the bridges 204 match those of the subpixel electrodes 201a . . . and those of the rivet sections 203, producing a symmetrical appearance.

In the liquid crystal display device 200 having the foregoing structure, liquid crystal molecules 210 in the vicinity of the rivet sections 203 . . . are aligned vertically to oblique surfaces of the rivet sections 203, as shown in FIG. 17(b). Specifically, the liquid crystal molecules 210 are aligned toward the central parts of the rivet sections 203 in all directions when observed from the opposed substrate.

The liquid crystal molecules 210 in a slit section 205 are aligned inwardly to the bridges 204, each of which is made of ITO, in the vicinity of the bridges 204 owing to oblique electric fields generated at the bridges 204, as shown in FIG. 17(c).

In a vertical direction in which the subpixel electrodes 201a are connected together, the liquid crystal molecules 210 are aligned by:

(i) adjacent rivet sections 203; and
(ii) oblique electric fields generated in the slit sections 205.

Accordingly, although not illustrated, the liquid crystal molecules 210 are aligned outwardly to the bridges 204 in the vertical direction in which the subpixel electrodes 201a are connected together.

In the vicinity of corner sections of the subpixel electrodes 201a . . . , the liquid crystal molecules 210 are all aligned outwardly to corner slits 206 by:

(i) oblique electric fields generated at end sections of the subpixel electrodes 201a; and (ii) adjacent rivet sections 203, as shown in FIG. 17(d).

The alignments of the liquid crystal molecules 210 shown in FIGS. 17(a), 17(b), 17(c) and 17(d), however, are ideal systems. In reality, the orientational central axes, which are formed on the bridges 204, of the liquid crystal molecules 210 deviate on the bridges 204, as shown in FIG. 17(e). The direction of this deviation is not fixed. Specifically, because each of the subpixel electrodes 201a is symmetrical, the directions in which the orientational central axes deviate on the bridges 204 are not fixed.

Thus, it is not possible to fix the deviations in orientations of the bridges 204 with respect to the whole liquid crystal panel, and therefore the deviations occur randomly, as shown in FIG. 18. This causes deterioration in display quality, such as graininess, burn-in, and afterimages.

Patent Literature 2, as shown in FIG. 19, discloses a liquid crystal display device of a vertically aligned system. In the liquid crystal display, a groove 302 in the shape of X is formed in each of three subpixel electrodes 301a, 301a, 301a, and the subpixel electrodes 301a, 301a, 301a are connected by connecting electrodes 303, 303 provided to respective two end sections.

However, the connecting electrodes 303, 303 in this liquid crystal display device are also positioned so as to be symmetric to the subpixel electrodes 301a. There is nothing to regulate the orientational central axes formed in the slit sections 304 between the connecting electrodes 303, 303. Thus, the orientational central axes are not fixed. This causes a problem of graininess, burn-in and the like, in the same manner as the cases discussed above.

The present invention is in view of the foregoing conventional problems, and has as an object to provide a liquid crystal display device of the vertically aligned system, and a method of producing the liquid crystal display device, by which deterioration in display quality is preventable, such as graininess, burn-in, afterimages and the like resulting from deviations in orientations of liquid crystal molecules due to connecting electrodes that connect subpixel electrodes.

To solve the above problems, a liquid crystal display device of the present invention is adapted so that a liquid crystal display device of a vertically aligned system includes: a liquid crystal panel having a pixel electrode constituted of a combination of at least two subpixel electrodes connected to each other or one another via a connecting electrode narrower than either one of the subpixel electrodes, and liquid crystal molecules tilting, when voltage is applied, axially symmetrically to an orientational central axis perpendicular to a surface of the subpixel electrodes. The connecting electrode is disposed asymmetrically to the subpixel electrodes.

To solve the above problems, a method for manufacturing a liquid crystal display device in accordance with the present invention is adapted so that, in the method for manufacturing a liquid crystal display device of a vertically aligned system, including a liquid crystal panel having a pixel electrode constituted of a combination of at least two subpixel electrodes connected to each other or one another via a connecting electrode narrower than either one of the subpixel electrodes, and liquid crystal molecules tilting, when voltage is applied, axially symmetrically to an orientational central axis perpendicular to a surface of the subpixel electrodes, the connecting electrode is disposed asymmetrically to the subpixel electrode.

The present invention focuses on a liquid crystal display device of the vertically aligned system with axially symmetrical tilting. In the liquid crystal display device, two or more subpixel electrodes of a liquid crystal panel are connected together via a connecting electrode narrower than the respective subpixel electrodes. The number of connecting electrodes between the respective subpixel electrodes can be one or more than one.

Meanwhile, in this type of liquid crystal display devices, the connecting electrode is generally provided symmetrically to the subpixel electrodes. Thus, a force defining the orientational central axis of the liquid crystal molecules above the connecting electrode becomes neutral and therefore is not stable. Therefore, in reality, the orientational central axis of the liquid crystal molecules above the connecting electrode is affected by the orientation of nearby liquid crystal molecules and tends to deviate from the center of the connecting electrode. The direction of this deviation at the respective connecting electrodes is not always fixed. This orientational disorder of the liquid crystal molecules causes deterioration in display quality, such as graininess, burn-in, afterimages and the like, in the overall liquid crystal panel.

In the present invention, the connecting electrode is disposed asymmetrically to the subpixel electrode. This eliminates a possibility that a force defining the orientational central axis of the liquid crystal molecules above the connecting electrode is neutral. Thus, it becomes possible to stably shift, in a fixed direction, the orientational central axes of the liquid crystal molecules above all connecting electrodes from respective centers of the connecting electrodes. In other words, the direction in which the liquid crystal molecules are to tilt becomes fixed.

The foregoing makes it possible to provide the liquid crystal display device of the vertically aligned system and the method of producing the liquid crystal display device, by which deterioration in display quality, such as graininess, burn-in, afterimages and the like, that occurs owing to orientational disorder of the liquid crystal molecules due to the connecting electrodes that connect the subpixel electrodes are preventable.

As discussed above, the connecting electrode in the liquid crystal display device of the present invention is disposed asymmetrically to the subpixel electrode.

As also discussed above, the method of producing the liquid crystal display device in accordance with the present invention includes disposing the connecting electrode asymmetrically to the subpixel electrode.

The foregoing eliminates a possibility that a force defining the orientational central axis of the liquid crystal molecules above the connecting electrode is neutral. Thus, it becomes possible to stably shift, in a fixed direction, the orientational central axes of the liquid crystal molecules above all connecting electrodes from respective centers of the connecting electrodes. In other words, the direction in which the liquid crystal molecules are to tilt becomes fixed.

This makes it possible to provide the liquid crystal display device of the vertically aligned system and the method of producing the liquid crystal display device, by which deterioration in display quality, such as graininess, burn-in, afterimages and the like, that occurs owing to orientational disorder of the liquid crystal molecules due to the connecting electrodes that connect the subpixel electrodes are preventable.

BRIEF DESCRIPTION OF DRAWINGS

[FIG. 2(a)] This is a plan view showing a position of a bridge connecting subpixel electrodes of the liquid crystal display device.

[FIG. 2(b)] This is a plan view showing an orientation state of liquid crystal molecules of the pixel electrodes.

[FIG. 5(a)] This is a plan view showing bridges connecting three subpixel electrodes in a case in which respective central axes of the bridges match that of the subpixel electrodes.

[FIG. 5(b)] This is a plan view showing bridges connecting the subpixel electrodes in a case in which central axes of the bridges are shifted rightward from the central axis of the subpixel electrodes.

[FIG. 5(c)] This is a plan view showing bridges connecting the subpixel electrodes in a case in which central axes of the bridges are alternately shifted rightward and leftward from the central axis of the subpixel electrodes.

[FIG. 7(a)] This is a plan view showing a bridge connecting subpixel electrodes in a transflective liquid crystal display device having a metal electrode mounted on the bridge, in a case in which a central axis of the bridge is shifted rightward from the central axis of the subpixel electrodes, in a liquid crystal device of another embodiment of the present invention.

[FIG. 7(b)] This shows a liquid crystal display device of another embodiment of the present invention. This is a plan view showing a bridge connecting the subpixel electrodes in the transflective liquid crystal display device having the metal electrode mounted on the bridge, in a case in which the central axis of the bridge is shifted rightward from the central axis of the subpixel electrodes.

FIG. [7(c)] This is a sectional view taken along line B-B shown in FIG. 7(b).

FIG. [8(a)] This is a plan view showing a bridge connecting subpixel electrodes constituted of reflecting electrodes, in a case in which a central axis of the bridge is shifted rightward from the central axis of the subpixel electrodes.

Figure 8:
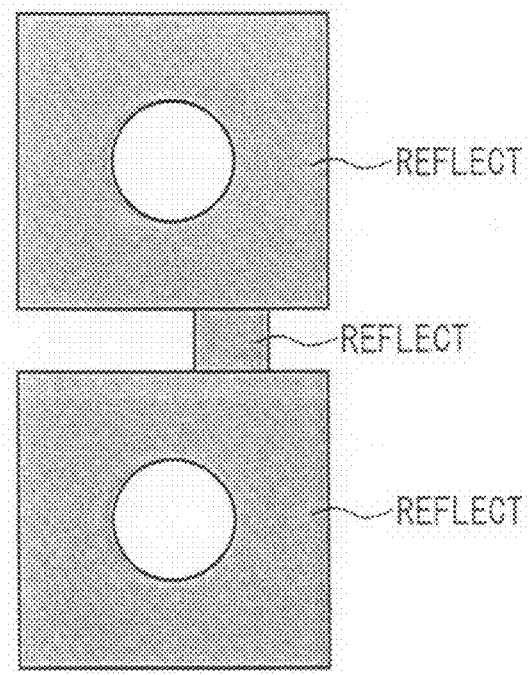
Figure 8:
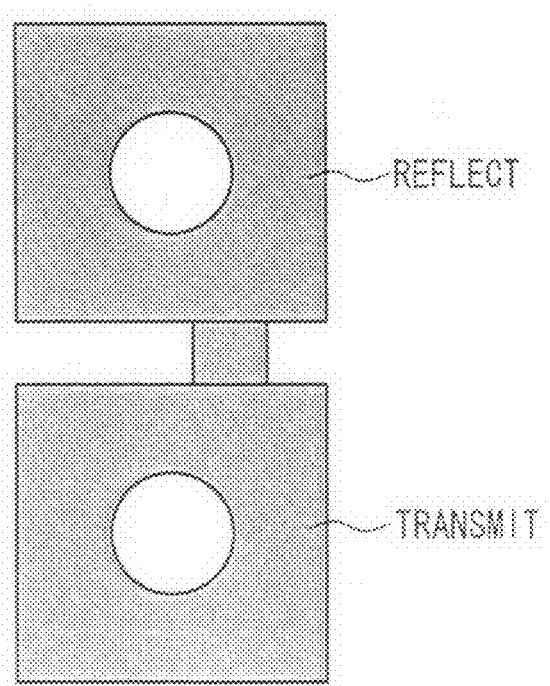

[FIG. 8(b)] This is a plan view showing a bridge connecting subpixel electrodes, one of which is a reflecting electrode and the other one of which is a transmitting electrode, in a case in which a central axis of the bridge is shifted rightward from a central axis of the subpixel electrodes.

[FIG. 9(a)] This is a plan view showing a bridge connecting subpixel electrodes in a liquid crystal device of another embodiment of the present invention, in a case in which not only the bridge but also an electrode having an electric potential different from that of the pixel electrodes are provided between the subpixel electrodes, and respective central axes of the bridge and the electrode, both of which connect the subpixel electrodes, are shifted rightward from the central axis of the subpixel electrodes.

[FIG. 9(b)] This is a plan view showing a bridge in a liquid crystal device of another embodiment of the present invention, in a case in which not only the bridge but also an electrode having an electric potential different from that of pixel electrodes are provided between the subpixel electrodes, and respective central axes of the bridge and the electrode, both of which connect the subpixel electrodes, are shifted rightward from the central axis of the subpixel electrodes.

[FIG. 10(a)] This is a plan view showing a bridge in a liquid crystal device of another embodiment of the present invention, in a case in which respective central axes of the bridge and an electrode, both of which connect the subpixel electrodes, are shifted leftward from the central axis of the subpixel electrodes in a vertically aligned module having aperture sections in an opposed electrode on an opposed-electrode's-side transparent substrate.

[FIG. 10(b)] This is a sectional view taken along line C-C shown in FIG. 10(a).

[FIG. 11(a)] This is a plan view showing a bridge in a vertically aligned module having aperture sections in a pixel electrode on a TFT's-side transparent substrate, in the case in which respective central axes of the bridge and an electrode, both of which connect the subpixel electrodes, are shifted leftward from the central axis of the subpixel electrodes, in a liquid crystal device of another embodiment of the present invention.

[FIG. 11(b)] This is a sectional view taken along line D-D shown in FIG. 11(a).

Figure 12:
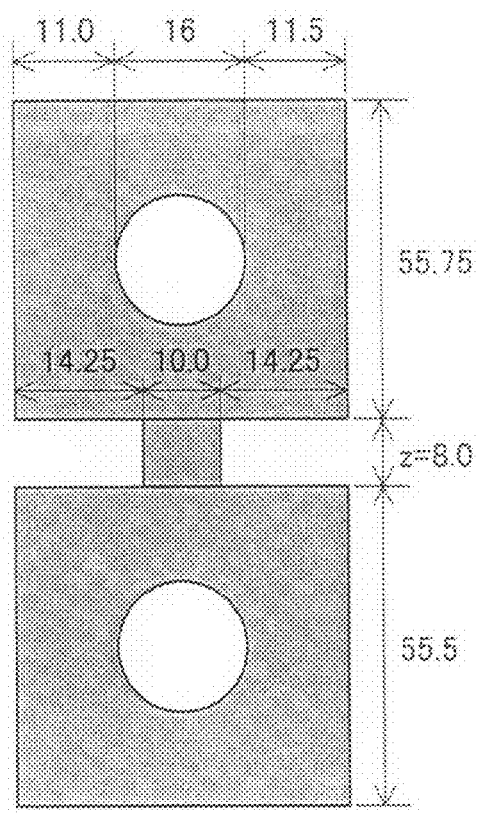
Figure 12:
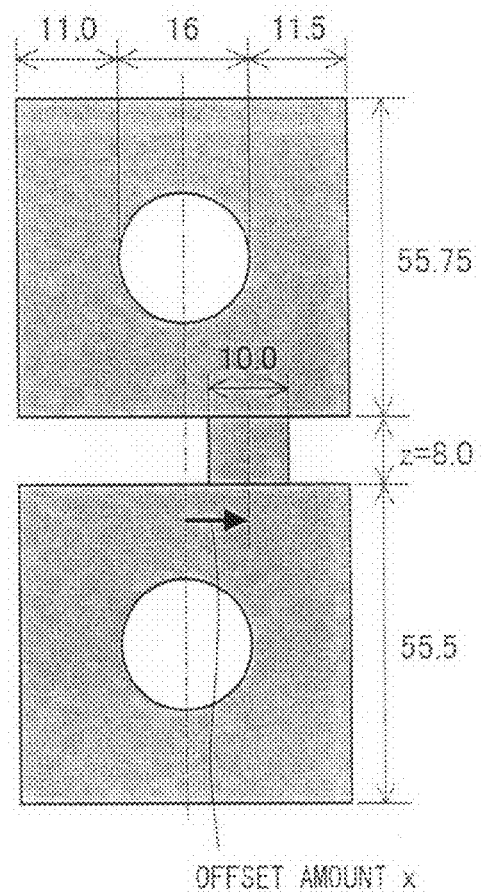

[FIG. 12(a)] This is a plan view showing a bridge connecting subpixel electrodes in accordance with a conventional design, in the case in which a central axis of the bridge matches that of the subpixel electrodes.

[FIG. 12(b)] This is a plan view showing a bridge connecting subpixel electrodes in a case in which a central axis of the bridge does not match that of the subpixel electrodes in a liquid crystal device of an example of the present invention.

[FIG. 13(a)] This is a plan view showing an orientation state of liquid crystal molecules in a case of a conventionally designed bridge that connects subpixel electrodes and has a central axis matching a central axis of the subpixel electrodes.

[FIG. 13(b)] This is a plan view showing an orientation state of liquid crystal molecules in a case of a bridge of a liquid crystal device according to an Example, which bridge connects subpixel electrodes and has a central axis shifted by 5 μm rightward from a central axis of the subpixel electrodes.

[FIG. 13(c)] This is a plan view showing an orientation state of liquid crystal molecules in a case of a bridge of a liquid crystal device according to an Example, which bridge connects subpixel electrodes and has a central axis shifted by 10 μm rightward from a central axis of the subpixel electrodes.

Figure 14:
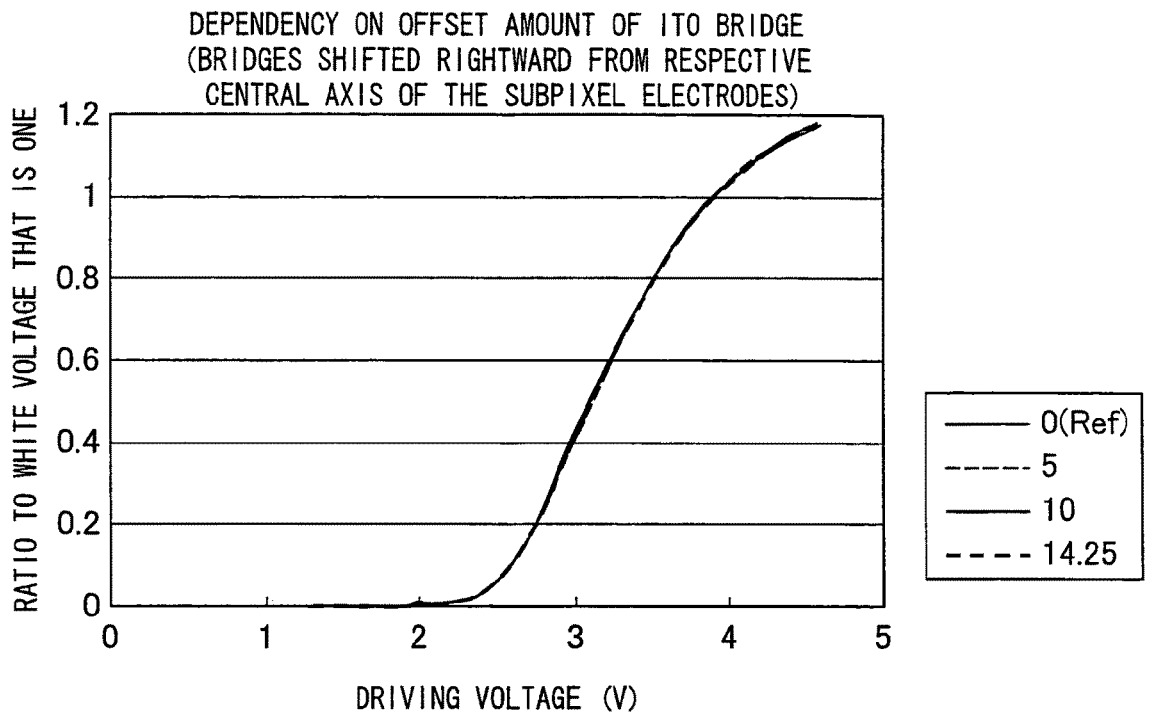
Figure 14:
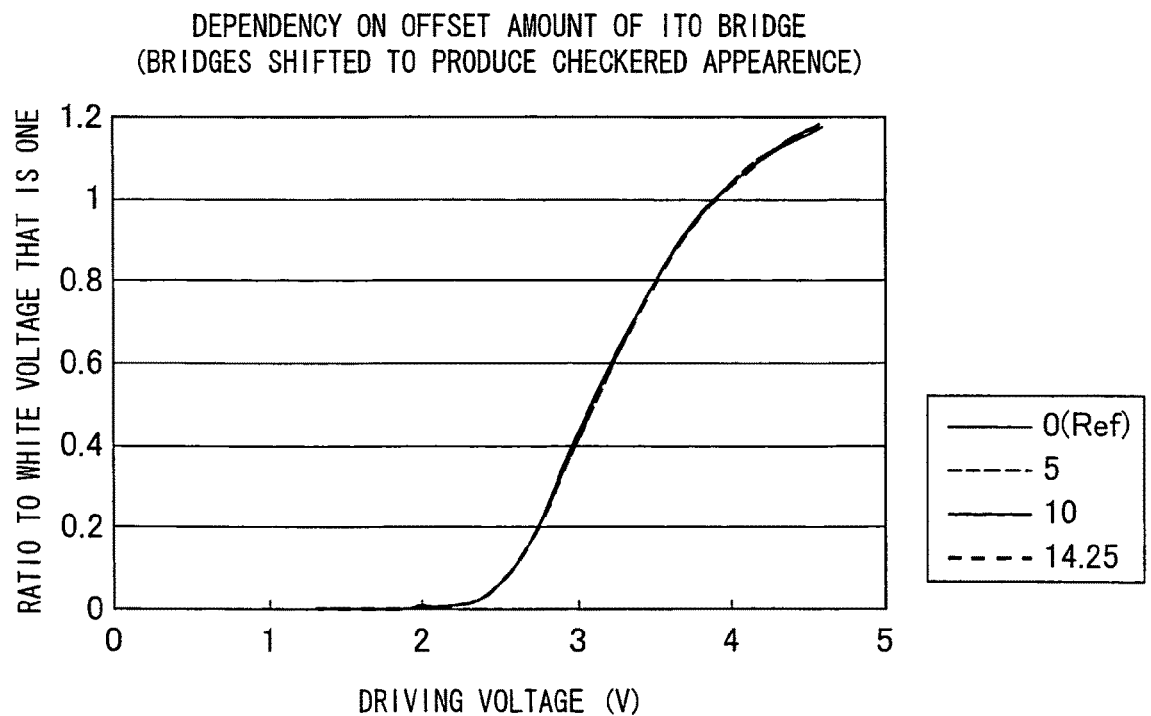

[FIG. 14(a)] This is a graph showing front V-T characteristics of a bridge of a liquid crystal device according to an Example, which bridge connects subpixel electrodes and has a central axis shifted rightward from a central axis of the subpixel electrodes.

[FIG. 14(b)] This is a graph showing front V-T characteristics of a bridge in a case in which central axes of the bridges connecting the pixel electrodes are shifted so as to produce a checkered pattern with respect to central axes of the subpixel electrodes.

[FIG. 15(a)] This is a graph showing contrast viewing angle characteristics in a liquid crystal device of an example, in the case in which the central axis of the bridge connecting the subpixel electrodes is shifted by 10 μm rightward from the central axis of the subpixel electrodes.

[FIG. 15(b)] This is a graph showing contrast viewing angle characteristics in the case in which the central axes of the bridges connecting the subpixel electrodes are arranged so as to produce a checkered pattern with respect to the central axis of the subpixel electrodes.

[FIG. 15(c)] This is a graph showing contrast viewing angle characteristics in the case in which the central axis of the bridge connecting the subpixel electrodes matches that of the subpixel electrodes.

[FIG. 15(d)] This is a figure showing a visual angle satisfying contrast viewing angle (CR)>10.

Figure 16:
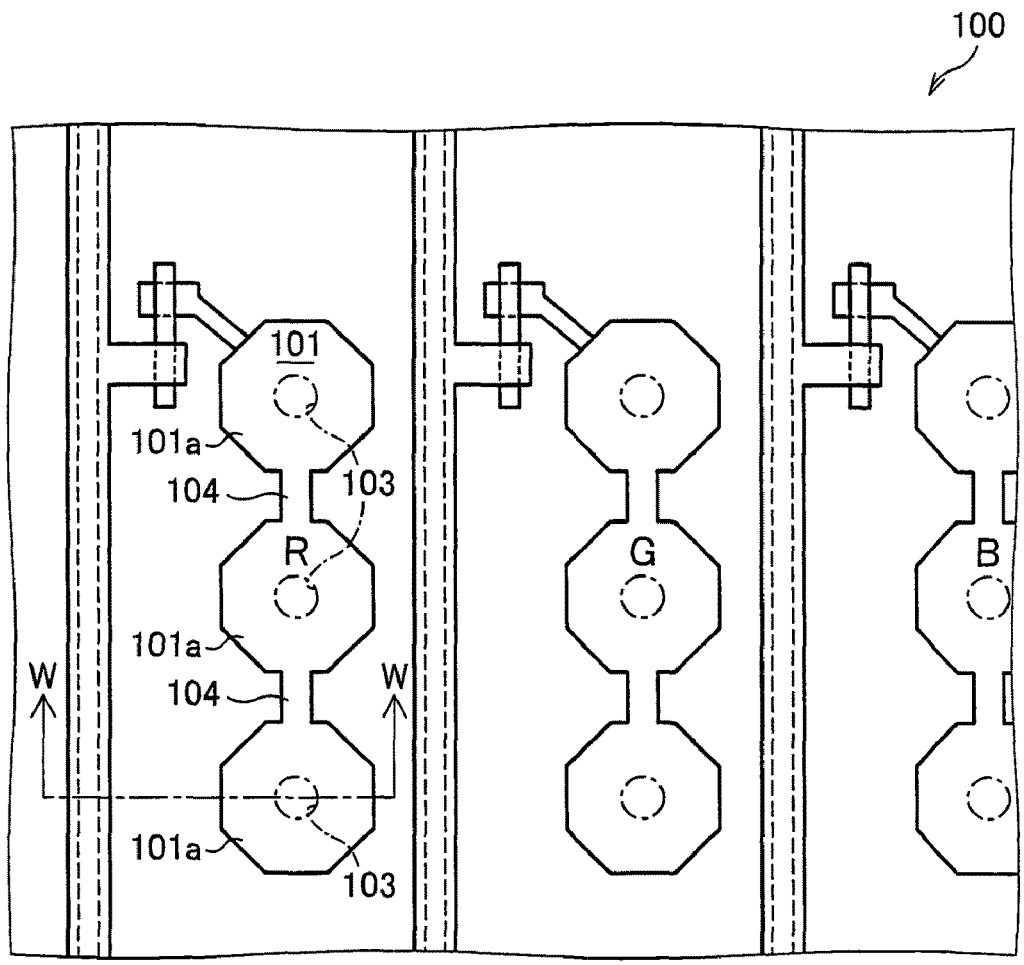
Figure 16:
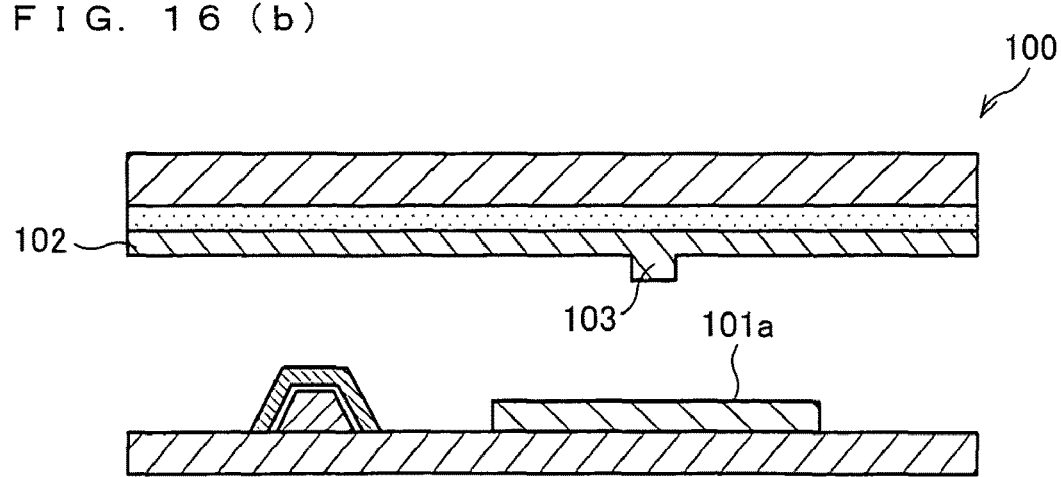

[FIG. 16(a)] This is a plan view showing structures of pixel electrodes and bridges in a conventional liquid crystal display device.

[FIG. 16(b)] This is a sectional view taken long line W-W shown in FIG. 16(a).

[FIG. 17(a)] This is a plan view showing an orientation state of liquid crystal molecules in subpixel electrodes and bridges of the liquid crystal display device.

[FIG. 17(b)] This is a sectional view taken along line X-X shown in FIG. 17(a).

[FIG. 17(c)] This is a sectional view taken along line Y-Y as shown in FIG. 17(a), illustrating an ideal system.

[FIG. 17(d)] This is a sectional view taken along line Z-Z shown in FIG. 17(a).

[FIG. 17(e)] This is a sectional view taken along line Y-Y shown in FIG. 17(a), illustrating a system in reality.

Figure 18:
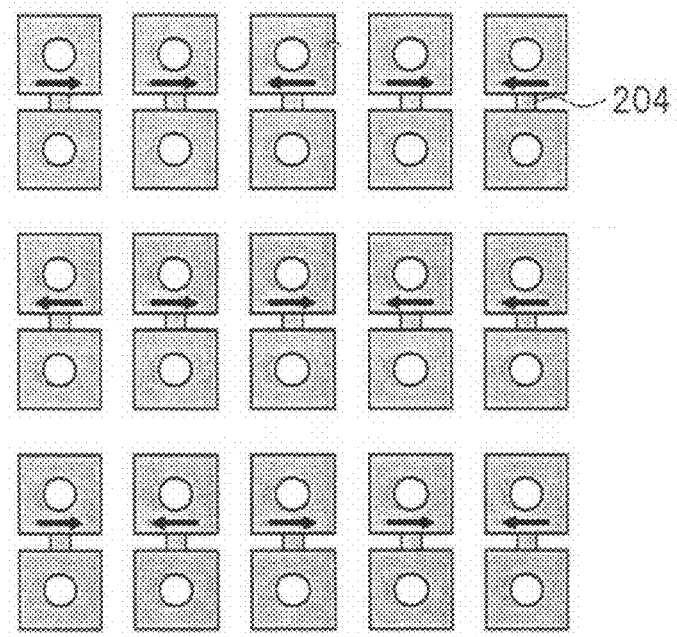

[FIG. 18] This is a plan view showing an orientation state of liquid crystal molecules in a bridge of the liquid crystal display device.

Figure 19:
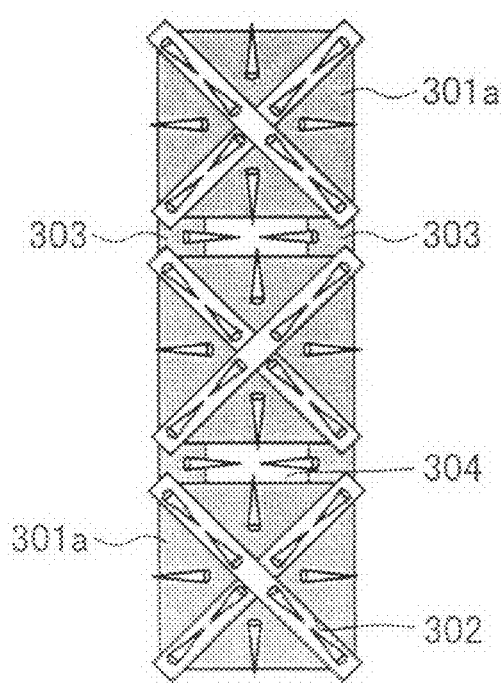

[FIG. 19] This is a plan view showing structures of pixel electrodes and bridges in other conventional liquid crystal display device.

EXPLANATION OF REFERENCES

1 TFT's-side transparent substrate
2 pixel electrode
2a subpixel electrode
2b pixel-electrode aperture section
3 bridge (connecting electrode)
4 slit
10 liquid crystal display device
11 opposed-electrode's-side transparent substrate
12 opposed electrode
12a opposed-electrode aperture section
15 rivet section
    (protruded section protruding toward the liquid crystal layer)
20 liquid crystal layer
21 liquid crystal molecules
30 liquid crystal display device
31 metal electrode

BEST MODE FOR CARRYING OUT THE INVENTION

Embodiment 1

The following describes an embodiment of the present invention, with reference to FIGS. 1(a) to 6(b).

Figure 1A:
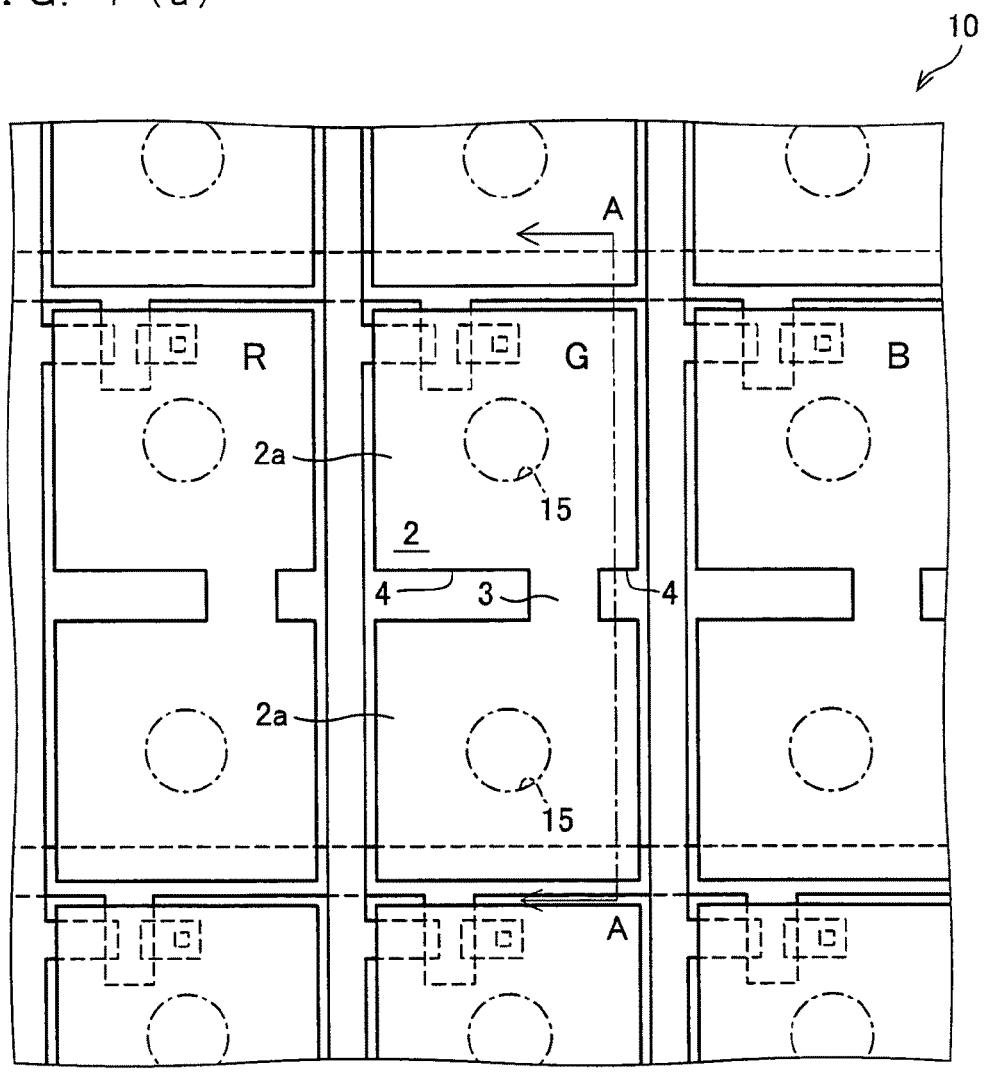
[FIG. 1(a)] This is a plan view showing pixels of a liquid crystal panel, according to an embodiment of a liquid crystal display device of the present invention.
Figure 1B:
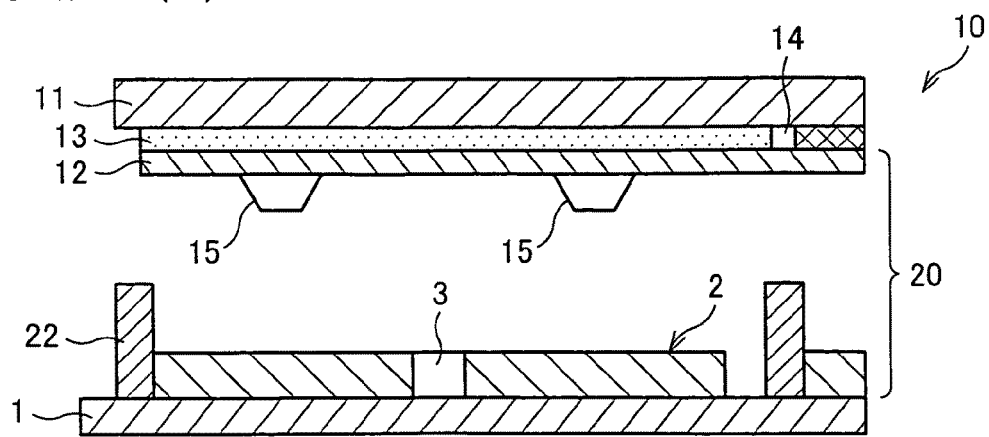
[FIG. 1(b)] This is a sectional view taken along line A-A shown in FIG. 1(a).

A structure of a liquid crystal display device 10 of the present embodiment is described below, with reference to FIGS. 1(a) and 1(b). FIG. 1(a) is a plan view of the liquid crystal display device 10. FIG. 1(b) is a sectional view taken along line A-A shown in FIG. 1(a).

As shown in FIGS. 1(a) and 1(b), the liquid crystal display device 10 of the present embodiment is a transmissive liquid crystal display device. A liquid crystal panel includes, for example, a TFT's-side (TFT stands for a Thin Film Transistor) transparent substrate 1 such as a glass substrate, an opposed-electrode's-side transparent substrate 11, which is disposed so as to face the TFT's-side transparent substrate 1, and a vertically-aligned type liquid crystal layer 20, which is provided between the TFT's-side transparent substrate 1 and the opposed-electrode's-side transparent substrate 11. Although not illustrated, a vertical alignment layer is provided on a surface of the TFT's-side transparent substrate 1 and on a surface of the opposed-electrode's-side transparent substrate 11, both of which surfaces are in contact with the liquid crystal layer 20. When no voltage is applied, the liquid crystal molecules of the liquid crystal layer 20 are aligned substantially vertically to the respective surfaces of the vertical alignment layers. The liquid crystal layer 20 contains nematic liquid crystal material having negative dielectric anisotropy.

The liquid crystal panel of the liquid crystal display device 10 includes a pixel electrode 2, which is provided on the TFT's-side transparent substrate 1, and an opposed electrode 12, which is provided on the opposed-electrode's-side transparent substrate 11. The liquid crystal layer 20 provided between the pixel electrode 2 and the opposed electrode 12 regulates pixels. In the present case, each of the pixel electrode 2 and the opposed electrode 12 is formed of a transparent conductive layer made of ITO (Indium Tin Oxide). The opposed-electrode's-side transparent substrate 11 is provided with a color filter 13, which is provided so as to correspond to a pixel, and a black matrix (light shielding layer) 14, which is provided between adjacent color filters 13. The color filter and the black matrix 14 are provided on a surface of the opposed-electrode's-side transparent substrate 11, which surface is close to the liquid crystal layer 20. The opposed electrode 12 is provided on the color filter and the black matrix 14. It should be noted, however, that the present invention is not limited to the foregoing structure. It is also possible to provide the color filter 13 and/or the black matrix 14 on a surface of the opposed electrode 12, which surface is close to the liquid crystal layer 20.

As shown in FIG. 1(a), the liquid crystal panel includes the pixel electrode 2 for red (R), the pixel electrode 2 for green (G), and the pixel electrode 2 for blue (B) that are disposed in this order. Each of the pixel electrodes 2 is constituted of two subpixel electrodes 2a, 2a that are disposed in a line. A bridge 3 is formed between the two subpixel electrodes 2a, 2a to serve as a connecting electrode. The bridge 3 is narrower than the subpixel electrodes 2a. Slits 4, 4 are formed on both sides of the bridge 3. The bridge 3 electrically connects the subpixel electrodes 2a. Note that although the subpixel electrodes 2a are each illustrated in the shape of a square, the subpixel electrodes 2a is not limited to this shape. The shape of the subpixel electrodes 2a can be in the shape of a polygon, such as a rectangle, a pentagon, a hexagon and the like, a circle, or an ellipse.

Rivet sections 15, each of which is protruded and in the shape of a circle, are provided to the opposed electrode 12 so as to face respective centers of the subpixel electrodes 2a, 2a. The rivet sections 15 each serve as a protruded section protruding toward the liquid crystal layer.

Accordingly, when a predetermined voltage is applied to the liquid crystal layer 20, liquid crystal molecules 21 under the rivet section in the liquid crystal layer 20 are aligned so as to be axially symmetric to a central axis of the rivet section 15. The liquid crystal molecules 21 will be described later. The rivet section 15 functions to fix the position of the central axis of this axial symmetry. The voltage applied between the subpixel electrode 2a and the opposed electrode 12 causes an oblique electric field to emerge in the vicinity of the rivet section 15. The oblique electric field regulates a direction in which the liquid crystal molecules 21 are to tilt. This results in the liquid crystal panel having a wider viewing angle.

Although it is preferable that the shape of the rivet section 15, which is provided to fix the orientational central axis of an axially symmetric orientation, be in the shape of a circle as exemplified above, the shape of the rivet section 15 is not limited to a circle. However, to have substantially equal orientational restraining force generated in all directions, a regular polygon having four or more sides is preferable. Further, the shape of a cross section viewed from the front does not necessarily have to be a trapezoid as discussed in the present embodiment. The shape of the cross section can be a rectangle or a triangle, for example.

The liquid crystal display device 10 has a light shielded area between adjacent pixels, and a wall structure 22 on the TFT's-side transparent substrate 1 inside of the light shielded area. The light shielded area is formed around the pixel electrode 2 on the TFT's-side transparent substrate 1. In the light shielded area, light is shielded by, for example, TFT, gate signal wirings, source signal wirings, or the black matrix 14 provided on the opposed-electrode's-side transparent substrate 11. The light shielded area does not contribute to a display. Therefore, the wall structure 22 provided in the light shielded area does not negatively affect a display.

It should be noted that, although illustrated as a continuous wall provided to surround a pixel, the wall structure 22 is not limited to how it is illustrated. The wall structure 22 may be divided into plural walls. The wall structure 22 functions to define a boundary formed in the vicinity of a line extended from an outer end of a pixel in a liquid crystal domain. It is therefore preferable that the wall structure 22 have a certain extent of length. For example in a case in which the wall structure 22 is constituted of plural walls, it is preferable that each wall have a length longer than a distance from the wall to an adjacent wall.

Providing a support in the light shielded area (area defined by the black matrix 14 in the present embodiment) to define a thickness (this is also called a cell gap) of the liquid crystal layer 20 is preferable because this does not deteriorate display quality.

Active elements such as TFT are provided on a surface of the TFT's-side transparent substrate 1, which surface is close to the liquid crystal layer 20. Although not illustrated, circuit elements, such as gate wirings and source wirings, connected to TFT are also provided to the surface of the TFT's-side transparent substrate 1. Sometimes, the TFT's-side transparent substrate 1, the circuits elements provided on the TFT's-side transparent substrate 1, the pixel electrode 2, the wall structure 22, the alignment layer and the like are collectively called an active matrix substrate.

Further, the color filter 13, the black matrix 14, the opposed electrode 12, the alignment layer and the like, all of which are provided on the opposed-electrode's-side transparent substrate 11, and the opposed-electrode's-side transparent substrate 11 are sometimes collectively called an opposed substrate or a color filter substrate.

Although the foregoing description does not mention, the liquid crystal display device 10 has a pair of polarizers that are disposed so as to be opposite to each other via the TFT's-side transparent substrate 1 and the opposed-electrode's-side transparent substrate 11. The polarizers are disposed in such a manner that transmission axes become perpendicular to each other.

Meanwhile, in a conventional liquid crystal display device, a bridge 3 connecting subpixel electrodes 2a, 2a exists on a line connecting rivet sections 15, 15, and in a central area of each of the subpixel electrode 2a, 2a, which are arranged symmetrically. Thus, the orientation of the liquid crystal molecules 21 above the bridge 3 is not stable. Therefore, a phenomenon occurs in which the orientational central axis of the liquid crystal molecules, which axis is formed therein, is shifted to either a right end or a left end of the bridge 3. The direction in which the orientational central axis shifts is not controllable with the conventional designs. Therefore, there has been a problem of deterioration in display quality, such as graininess, burn-in, and afterimages. Specifically, the orientational central axis shifts randomly in the overall liquid crystal panel, causing a display to have graininess, for example.

One possible way to respond to this problem is to form the bridge 3 in small pieces. With the smaller pieces of the bridge 3, however, conduction between the subpixel electrodes 2a, 2a deteriorates. Forming the bridge 3 thick is another possible way. However, even if the bridge 3 is formed thick, the orientation of the liquid crystal molecules 21 is still unstable as long as the subpixel electrodes 2a, 2a and the bridge 3 are symmetric. Another possible way is to widen the distance between the subpixel electrodes 2a, 2a, but this has a problem that an open area ratio decreases.

In view of the foregoing, the position of the bridge 3 in the liquid crystal display device 10 of the present embodiment is shifted rightward from the center line, as shown in FIG. 1(a). It should be noted, however, that the position of the bridge 3 is not necessarily limited to the foregoing position. It is also possible to shift the position of the bridge 3 leftward.

Figure 3:
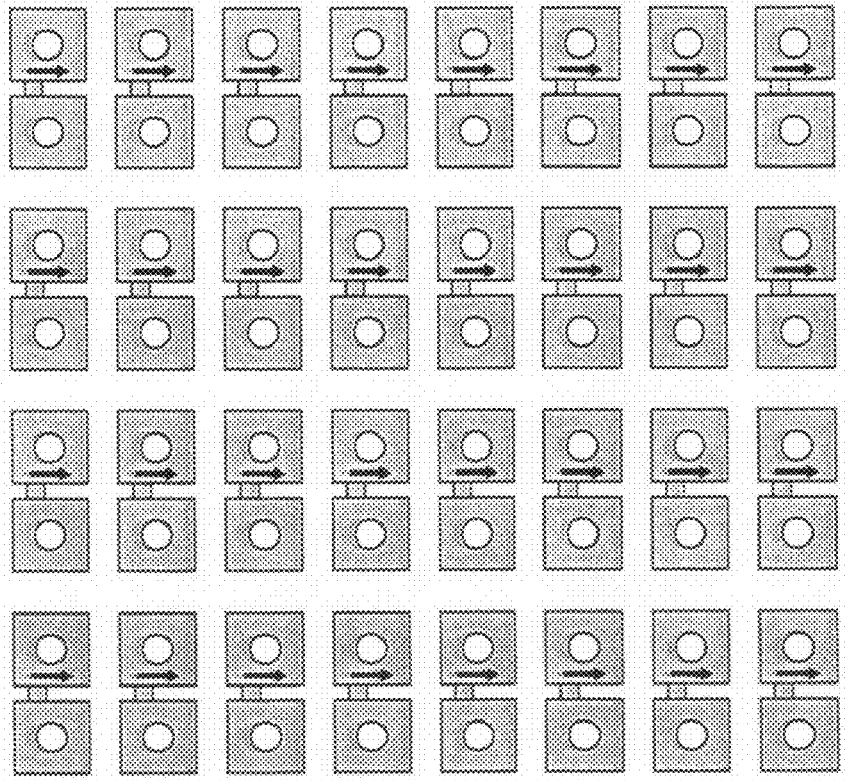
[FIG. 3] This is a plan view showing a liquid crystal panel in which bridges of the plural pixel electrodes are shifted in the same direction.

As a result, the direction in which the orientational central axis of the liquid crystal molecules 21 above the bridge 3 shifts is always the direction opposite to an offset direction of the bridge 3, as shown in FIGS. 2(a) and 2(b). Accordingly, when the overall display panel of the liquid crystal display device 10 is considered, the liquid crystal molecules 21 at each bridge 3 shift in a single fixed direction, as shown in FIG. 3. Thus, no graininess, burn-in, or afterimage is caused.

In the present embodiment, the bridge 3 (connecting electrode) and the pixel electrode 2 are formed of a same layer, and the bridges 3 at all pixel electrodes 2 are shifted in the same direction, as shown in FIG. 3. In other words, every pixel has the same pixel electrode structure. In FIG. 3, every pixel is shifted rightward.

Figure 4:
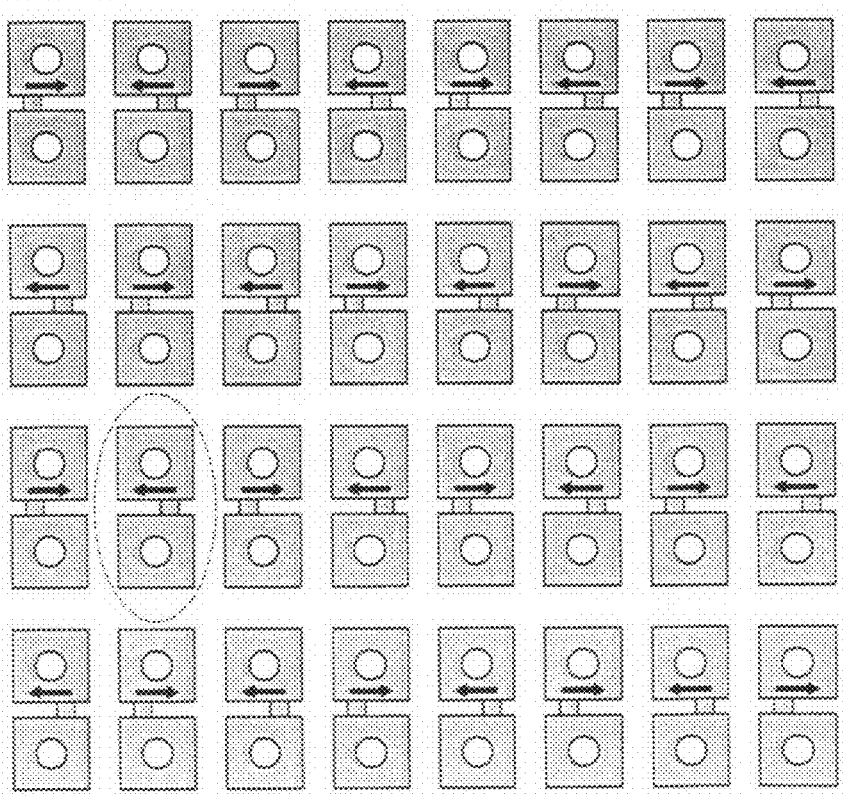
[FIG. 4] This is a plan view showing a liquid crystal panel in which bridges of the pixel electrodes are shifted so as to produce a checkered pattern among adjacent pixel electrodes.

It should be noted, however, that the arrangement of the bridges is not limited to the foregoing arrangement. For example, it is also possible to arrange the bridges 3 in such a manner that the bridges 3 of adjacent pixel electrodes 2 are to shift in the opposite directions from each other, so-called a checkered pattern, as shown in FIG. 4. For example, the bridge 3 in the pixel electrodes 2 indicated by the dashed-line circle in FIG. 4 is shifted rightward. When the pixel electrode 2 marked with the dashed-line circle is focused, the adjacent pixel electrodes 2 on the right, left, top, and bottom are all shifted leftward.

In the exemplary case discussed above, one bridge 3 connects two subpixel electrodes 2a, 2a. The number of the subpixel electrodes 2a, however, is not limited to two. As shown in FIGS. 5(a), 5(b), and 5(c), it is also possible to dispose three or more subpixel electrodes 2a, 2a, 2a in a single line in the pixel electrode 2. In this case, if plural slits 4 are formed between the subpixel electrodes 2a, and if the subpixel electrodes 2a are disposed serially, it is possible to shift the bridges 3 in such a manner that that bridges 3 in adjacent slits 4 are shifted in a same direction, as shown in FIG. 5(b).

Further, if plural slits 4 are formed between the subpixel electrodes 2a, and if three subpixel electrodes 2a are disposed serially, it is possible to shift the bridges 3 in such a manner that the bridges 3 in adjacent slits 4 are shifted in opposite directions, as shown in FIG. 5(*c*).

Figure 6:
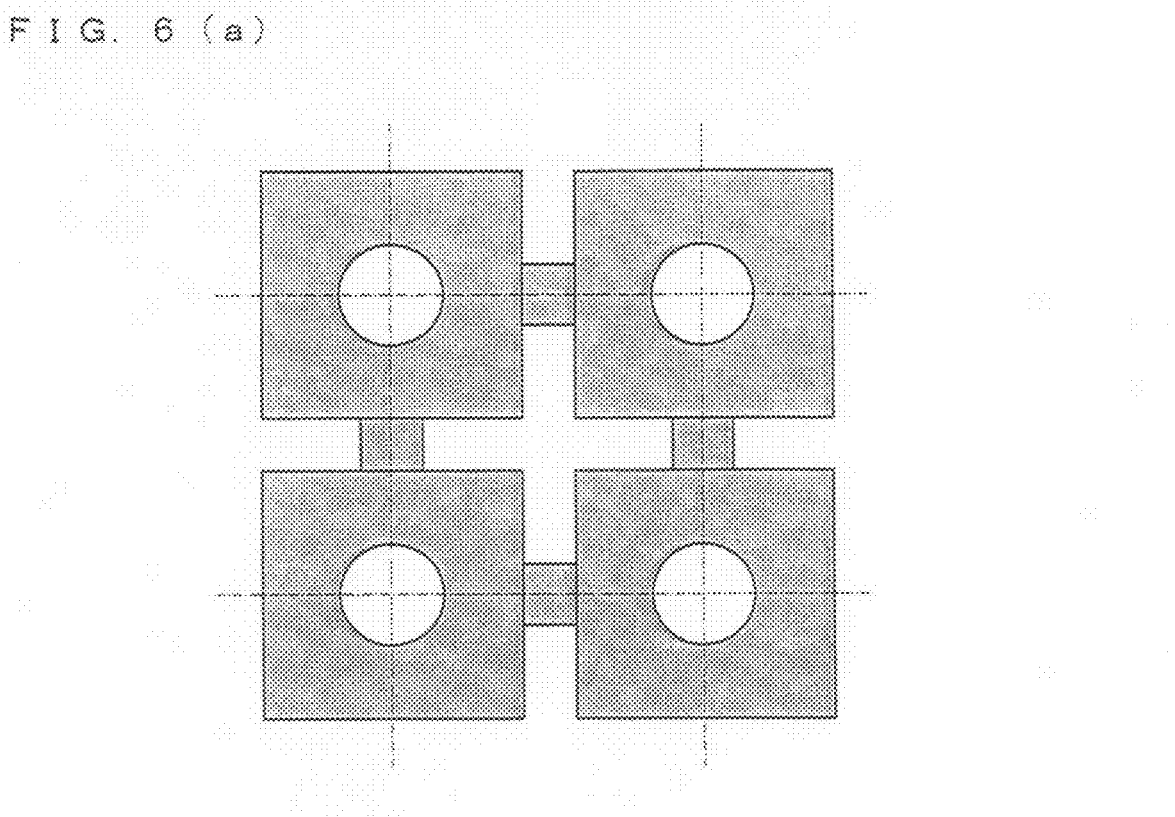
[FIG. 6(a)] This is a plan view showing bridges connecting four subpixel electrodes disposed in matrix in a case in which central axes of the bridges match those of the subpixel electrodes, respectively.
[FIG. 6(b)] This is a plan view showing bridges connecting the subpixel electrodes in a case in which central axes of the bridges are alternately shifted rightward and leftward from the central axes of the subpixel electrodes, respectively.
Figure 6:
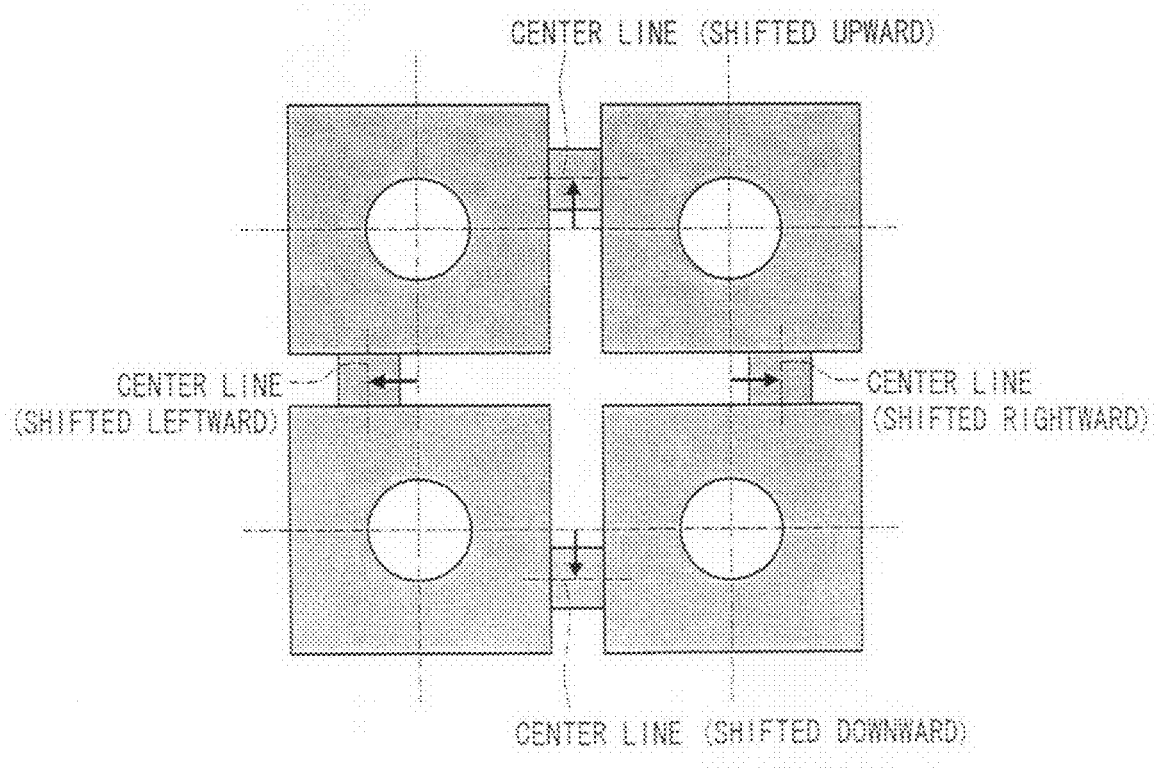

Further, it is also possible to arrange plural subpixel electrodes 2*a* in matrix, as shown in FIGS. 6(*a*) and 6(*b*). In this case, it is preferable that the bridges 3 in adjacent slits 4 shift in the opposite directions from each other in the adjacent slits 4, as shown in FIG. 6(*b*). It should be noted that, although the subpixel electrodes 2*a* in the present embodiment are arranged in the 4-by-4 matrix, the arrangement of the subpixel electrodes 2*a* is not necessarily limited to what discussed in the present embodiment. It is also possible to arrange more than four subpixel electrodes 2*a* in matrix.

Accordingly, the liquid crystal display device 10 of the present embodiment and a method of producing the liquid crystal display device 10 are focused on a liquid crystal display device 10 of the vertically aligned system, in which liquid crystal molecules tilt in an axial symmetric manner, with two or more subpixel electrodes 2*a* of a liquid crystal panel being connected by a bridge 3 that is narrower than the subpixel electrodes 2*a*. The number of bridge 3 to be provided between the subpixel electrodes 2*a* may be either one or more than one.

Further, the bridge 3 in the present embodiment is disposed asymmetrically to the subpixel electrodes 2*a*. This eliminates a possibility that a force defining the orientational central axis of the liquid crystal molecules 21 above the bridge 3 is neutral. Thus, it becomes possible to stably shift, in a fixed direction, the orientational central axes of the liquid crystal molecules 21 above all bridges 3 from respective centers of the bridges 3. In other words, the direction in which the liquid crystal molecules 21 are to tilt becomes fixed.

The foregoing makes it possible to provide the liquid crystal display device 10 of the vertically aligned system and the method of producing the liquid crystal display device 10, by which deterioration in display quality, such as unevenness, graininess, and afterimages, that occurs owing to orientational disorder of the liquid crystal molecules 21 due to the bridges 3 connecting the subpixel electrodes 2*a* are preventable.

Further, with the liquid crystal display device 10 and the method of producing the liquid crystal display device 10 in accordance with the present embodiment, the bridges 3 are provided one for each space between the respective subpixel electrodes 2*a*. Accordingly, each of the bridges 3 is disposed in such a manner that the center line of the subpixel electrodes 2*a* in a direction parallel to a line connecting the subpixel electrodes 2*a* together does not match the center line of the bridge 3, whereby the bridge 3 is disposed asymmetrically to the subpixel electrodes 2*a*. In other words, a singular point of orientation deviates from the center line of the subpixel electrodes 2*a*.

The foregoing makes it possible to provide the liquid crystal display device 10 of the vertically aligned system and the method of producing the liquid crystal display device 10, by which deterioration in display quality, such as unevenness, graininess, and afterimages, that occurs owing to orientational disorder of the liquid crystal molecules 21 due to the bridges 3 connecting the subpixel electrodes 2*a* are preventable.

Further, in the liquid crystal display device 10 of the present embodiment, the rivet sections 15 are provided to the opposed electrode 12, which faces the subpixel electrode 2*a*, in such a manner as to face the centers of the subpixel electrodes 2*a*, respectively. Further, when voltage is applied, the liquid crystal molecules 21 tilt axially symmetrically to an orientational central axis in a direction perpendicular to a surface of the subpixel electrodes 2*a*, which orientational central axis is formed in the liquid crystal layer 20 below the rivet sections 15.

The foregoing makes it possible to prevent deterioration in display quality, such as unevenness, graininess, and afterimages, that is caused owing to orientational disorder of the liquid crystal molecules 21 due to the bridge 3 connecting the subpixel electrodes 2*a* in the liquid crystal display device 10 of the vertically aligned system, in which the rivet sections 15 are formed in the opposed electrodes 12 such that the rivet sections face the central parts of subpixel electrodes 2*a*, respectively.

Further, the bridges 3 of the liquid crystal display device 10 of the present embodiment are formed in the layer in which the subpixel electrodes 2*a* are formed.

The foregoing makes it possible to provide the liquid crystal display device 10 of the vertically aligned system, in which the bridges 3 are formed in a layer in which the subpixel electrodes 2*a* are formed, and the method of producing the liquid crystal display device 10, by which deterioration in display quality, such as unevenness, graininess, and afterimages, that occurs owing to orientational disorder of the liquid crystal molecules 21 due to the bridges 3 connecting the subpixel electrodes 2*a* are preventable.

Further, in the liquid crystal display device 10 of the present embodiment, the bridges 3 are provided in such a manner that the center lines of all of the bridges 3 shift in the same direction, from the center lines of the subpixel electrodes 2*a* of all of the pixel electrodes 2 in the liquid crystal panel.

As a result, the center lines of the bridges 3 all shift in the same direction from all of the pixel electrodes 2 in the liquid crystal panel. Thus, no orientational disorder of the liquid crystal molecules 21 occurs. This makes it possible to prevent deterioration in display quality, such as unevenness, graininess, and afterimages, that occurs owing to orientational disorder of the liquid crystal molecules 21.

Further, it is also possible in the liquid crystal display device 10 of the present embodiment that the center lines of the bridges 3 shift in a regular manner, so-called a checkered pattern, with respect to all of the pixel electrodes 2 of the liquid crystal panel. This makes it possible to prevent deterioration in display quality, such as graininess, burn-in, afterimages and the like, that is caused owing to orientational disorder of the liquid crystal molecules 21, when the liquid crystal panel is viewed from any direction.

Further, it is possible in the liquid crystal display device 10 of the present embodiment to dispose three or more subpixel electrodes in a single line. In this case, the bridges 3 are disposed in such a manner that the center lines of the bridges 3 shift from the center lines of the subpixel electrodes 2*a* in opposite directions alternately.

This makes it possible to prevent deterioration in display quality, such as graininess, burn-in, afterimages and the like, that is caused owing to orientational disorder of the liquid crystal molecules in the liquid crystal display device 10 of the vertically aligned system having three or more subpixel electrodes 2*a* disposed in a single line, when the liquid crystal panel is viewed from any direction.

Further, it is possible in the liquid crystal display device 10 of the present embodiment to dispose plural subpixel electrodes 2*a* in matrix. In this case, the bridges 3 are disposed in such a manner that the center lines of the bridges 3 shift from the center lines of the subpixel electrodes 2*a* in opposite directions among adjacent subpixel electrodes 2*a*.

This makes it possible to prevent deterioration in display quality, such as graininess, burn-in, afterimages and the like, that is caused owing to orientational disorder of the liquid crystal molecules 21 in the liquid crystal display devices 10 of the vertically aligned system having the subpixel electrodes 2a disposed in matrix, when the liquid crystal panel is viewed from any direction.

Further, the subpixel electrode 2a and the bridge 3 are each constituted of a transmitting electrode in the liquid crystal display device 10 of the present embodiment. This makes it possible to prevent deterioration in display quality, such as graininess, burn-in, afterimages and the like, that is caused owing to orientational disorder of the liquid crystal molecules 21 in the transmissive liquid crystal display device 10 of the vertically aligned system.

Further, it is preferable in the liquid crystal display device 10 of the present embodiment that the amount of eccentricity of the center lines of the bridges 3 with respect to the center lines of the subpixel electrodes 2a be 5 μm or more.

This makes it possible to reliably prevent deterioration in display quality, such as graininess, burn-in, afterimages and the like, that is caused owing to orientational disorder of the liquid crystal molecules 21.

In the present embodiment, the bridge 3 is provided one for each space between the subpixel electrodes 2a, 2a. The present invention, however, is not necessarily limited to this arrangement. It is also possible to provide plural bridges 3, as long as the bridges 3 are provided asymmetrically to the subpixel electrode 2a.

Embodiment 2

The following describes another embodiment of the present invention, with reference to FIGS. 7(a) to 7(c). Structures other than those described in the present embodiment are the same as those in Embodiment 1. For the convenience of description, components having the same functions as those shown in the drawings of Embodiment 1 are given the same reference numerals, and explanation thereof is omitted.

In the liquid crystal device 30 of the present embodiment, a metal electrode 31 made of, for example, aluminum (Al) is provided on the bridge 3, as shown in FIG. 7(a). The metal electrode 31 is provided on the bridge 3 so that redundant electrical connection is established to improve conductivity between the subpixel electrodes 2a.

In the case in which a redundant structure with addition of the metal electrode 31 to electrical connection of the bridges 3 is employed, it is preferable to shift the center lines of the bridges 3 and to shift the center lines of the metal electrode 31 by the same amount as the center lines of the bridges 3 are shifted, as shown in FIG. 7(b). In a case in which a reflecting electrode for the subpixel electrode is provided on a different subpixel electrode, which is not illustrated, the metal electrode 31 is formed in a layer in which the reflecting electrode is formed.

In the liquid crystal display device 30 of the present embodiment, the metal electrode 31, which is a layer different from the bridge 3, is provided on the bridge 3, and the center line of the metal electrode 31 substantially matches the center line of the bridge 3.

The foregoing makes it possible to prevent deterioration in display quality, such as graininess, burn-in, afterimages and the like, that is caused owing to orientational disorder of the liquid crystal molecules 21 in the liquid crystal display device 30 of the vertically aligned system, in which the metal electrode 31 is provided on the bridge 3.

In the present embodiment, the metal electrode 31 is redundantly provided in combination with the bridge 3 to improve conductivity between the subpixel electrodes 2a. It should be noted that the present invention is not necessarily limited to this arrangement. It is also possible to provide the metal electrode 31 as a reflecting electrode.

Embodiment 3

The following describes another embodiment of the present invention, with reference to FIGS. 8(a) and 8(b). Structures other than those described in the present embodiment are the same as those in Embodiments 1 and 2. For the convenience of description, components having the same functions as those shown in the drawings of Embodiments 1 and 2 are given the same reference numerals, and explanation thereof is omitted.

The liquid crystal display device 10 of Embodiment 1 discussed above is a transmissive liquid crystal display device. It should be noted, however, that the liquid crystal display device of the present invention is not limited to the liquid crystal display devices discussed above, and is also applicable to transflective or reflective liquid crystal display devices 30.

For example, it is possible to form the subpixel electrodes 2a, 2a, and the bridge 3 each with a reflecting electrode, as shown in FIG. 8(a). This makes it possible to provide a reflective liquid crystal display device 30. It is preferable that the metal layer used in the reflecting electrode be a highly-reflective metal layer made of, for example, aluminum (Al).

It is also possible to arrange the subpixel electrodes 2a constituting one pixel electrode 2 in such a manner that one of the subpixel electrodes 2a is formed of a reflecting electrode while the other one of the subpixel electrodes 2a is formed of a transmitting electrode, as shown in FIG. 8(b). In this case, the bridge 3 can be either a reflecting electrode or a transmitting electrode.

Further, it is possible in the liquid crystal display device 30 of the present embodiment, and in the method for manufacturing the liquid crystal display device 30, to form the metal electrode 31, which is provided on the bridge 3, concurrently with forming the reflecting electrode for the subpixel electrode. Accordingly, no additional process of forming the metal electrode 31 provide on the bridge 3 becomes necessitated.

Further, it is possible to constitute the subpixel electrode 2a and the bridge 3 each with a reflecting electrode in the liquid crystal display device 30 of the present embodiment.

This makes it possible to prevent deterioration in display quality, such as graininess, burn-in, afterimages and the like, that is caused owing to orientational disorder of the liquid crystal molecules 21 in the reflective liquid crystal display device 30 of the vertically aligned system.

Further, the subpixel electrodes 2a of the liquid crystal display device 30 of the present embodiment can be constituted of a transmitting electrode and a reflecting electrode.

This makes it possible to prevent deterioration in display quality, such as graininess, burn-in, afterimages and the like, that is caused owing to orientational disorder of the liquid crystal molecules 21 in the transflective-type liquid crystal display device 30 of the vertically aligned system.

Embodiment 4

The following describes another embodiment of the present invention, with reference to FIGS. 9(a) and 9(b). Structures other than those described in the present embodiment are the same as those in Embodiments 1 to 3. For the convenience of description, components having the same functions as those shown in the drawings of Embodiments 1 to 3 are given the same reference numerals, and explanation thereof is omitted.

Figure 9:
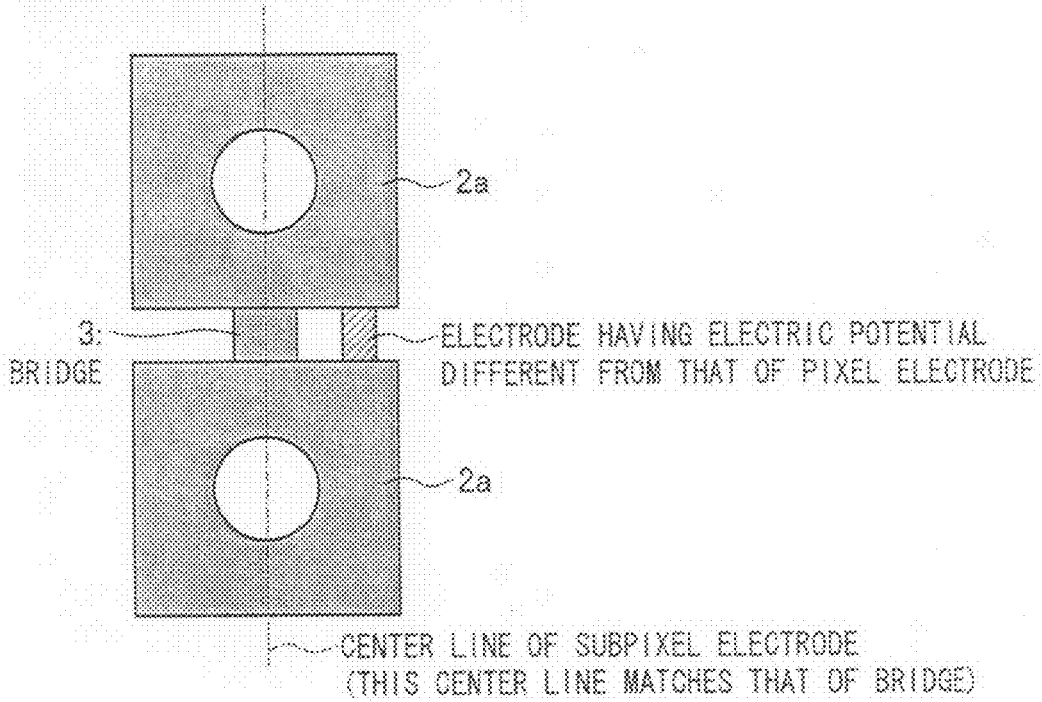
Figure 9:
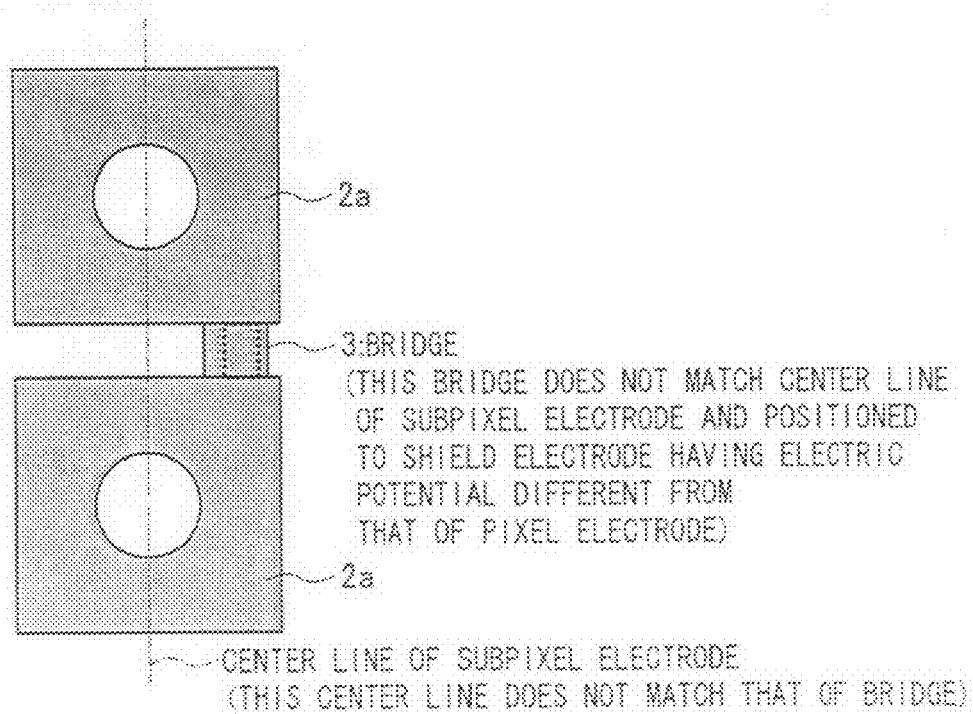

There is a case in which the pixel electrode 2, differing from Embodiments 1 to 3, has a layer that is provided in the slit 4, differs from the pixel electrode 2, and is exposed, as shown in FIG. 9(*a*). Examples of the case include: an electrode layer that is same as a gate signal line in electric potential is exposed in this section; an electrode layer that is same as a source signal line in electric potential is exposed; and an electrode layer that has a same electric potential as that of the pixel electrode 2 and is a layer different from the pixel electrode 2 (e.g. a lower layer of the pixel electrode 2) is exposed. For example if an electrode layer having an electric potential different from that of the pixel electrode 2 is exposed, an electric filed generated in this section transiently changes orientation of the liquid crystal molecules 21 around the subpixel electrode 2*a*. This sometimes causes problems of graininess, afterimages, and the like. Further, if the electrode has a same electric potential as that of the pixel electrode 2, an intended orientation is not attained in some cases owing to the electrode added as well as the shape of the electrodes that the pixel electrode 2 originally has.

In the foregoing cases, it is preferable that either the bridge 3 present in the slit 4 be disposed as shown in FIG. 9(*b*) so as to shield a section with an electric potential different from that of the pixel electrode 2, or the bridge 3 present in the slit 4 be disposed so as to become close to the section although not illustrated.

The foregoing makes it possible to prevent deterioration in display quality, such as graininess, burn-in, afterimages and the like, that is caused owing to orientational disorder of the liquid crystal molecules 21 in the liquid crystal display device of the vertically aligned system, in which an electrode that is a layer different from the subpixel electrode 2*a*, is provided in the lower layer of the subpixel electrode 2*a*.

Embodiment 5

Figure 10:
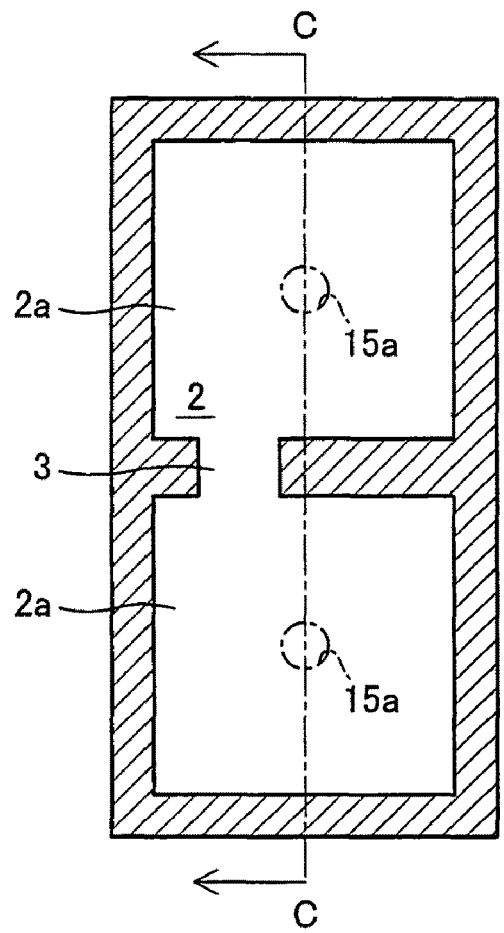
Figure 10:
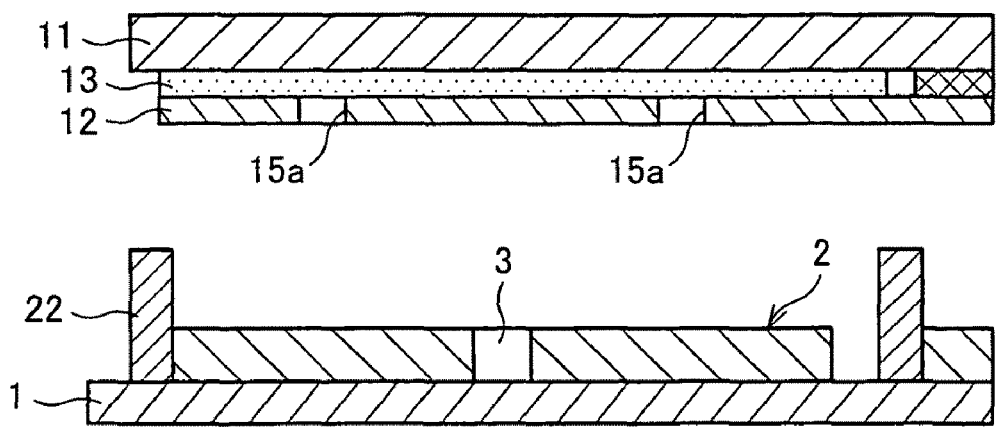

The following describes another embodiment of the present invention, with reference to FIGS. 10(*a*) to 11(*b*). Structures other than those described in the present embodiment are the same as those in Embodiments 1 to 4. For the convenience of description, components having the same functions as those shown in the drawings of Embodiments 1 to 4 are given the same reference numerals, and explanation thereof is omitted.

The liquid crystal display devices 30 discussed in Embodiments 1 to 4 above each have the rivet section 15 in the opposed-electrode's-side transparent substrate 11, whereby the vertically aligned module is provided.

The present invention is not limited to those discussed in the foregoing embodiments. It is also possible to form an opposed-electrode aperture section 15*a* in the opposed-electrode's-side transparent substrate 11 as shown in FIGS. 10(*a*) and 10(*b*), in place of the rivet section 15 formed in the opposed-electrode's-side transparent substrate 11, whereby the vertically aligned module is realized.

The structure to realize the vertically aligned module is not necessarily limited to the foregoing structure. It is also possible to form pixel-electrode aperture sections 2*b*, 2*b* in subpixel electrodes 2*a*, 2*a* of the pixel electrode 2, respectively, as shown in FIGS. 11(*a*) and 11(*b*).

The foregoing makes it possible to prevent deterioration in display quality, such as graininess, burn-in, afterimages and the like, that is caused owing to orientational disorder of the liquid crystal molecules 21 in various liquid crystal display devices of the vertically aligned system.

EXAMPLE

The following Examples discuss results of inspection testing performed on the amount of shifting from the center of the bridge 3 of the transmissive liquid crystal display device 10 of a vertically aligned mode to reduce graininess due to an orientational cause.

The testing was performed under the conditions as specified in Table 1.

TABLE 1

| | | DESIGN PARAMETER | | | EVALUATION OF DISPLAY QUALITY | | | |
|---|---|---|---|---|---|---|---|---|
| DETAILS OF TESTING | | OFFSET AMOUNT X | BRIDGE WIDTH | SLIT WIDTH Z | GRAINI- NESS | BURN- IN | AFTER- IMAGE PERIOD | RESULTING MARK OF FINGER PRESS |
| OFFSET OF BRIDGE SHIFTED RIGHTWARD | EXAMPLE 1 | 5.0 | 10.0 | 8.0 | GOOD | GOOD | 3 SEC | GOOD |
| | EXAMPLE 2 | 10.0 | 10.0 | 8.0 | GOOD | GOOD | 1 SEC | GOOD |
| | EXAMPLE 3 | 14.25 | 10.0 | 8.0 | AVER- AGE | GOOD | 0 SEC | GOOD |
| OFFSET OF BRIDGE DISPOSED IN CHECKERED PATTERN | EXAMPLE 4 | 5.0 | 10.0 | 8.0 | GOOD | GOOD | 1 SEC | GOOD |
| | EXAMPLE 5 | 10.0 | 10.0 | 8.0 | GOOD | GOOD | 0 SEC | GOOD |
| | EXAMPLE 6 | 14.25 | 10.0 | 8.0 | GOOD AVER- AGE | GOOD | 0 SEC | GOOD |
| BRIDGE DISPOSED CENTRALLY | CONVEN- TIONAL EXAMPLE | 0.0 | 10.0 | 8.0 | POOR | POOR | 4 SEC | POOR |

The testing was carried out with the liquid crystal panels roughly classified into: a liquid crystal panel having all bridges 3 shifted leftward from respective pixel electrodes 2 as shown in FIG. 3 (Examples 1 to 3); the liquid crystal panel having all bridges 3 disposed in checkered pattern with respect to respective pixel electrodes 2 as shown in FIG. 4 (Examples 4 to 6); and a liquid crystal panel of a conventional example with bridges disposed at respective centers of subpixel electrodes as shown in FIG. 18.

As shown in FIGS. 12(a) and 12(b), the widths of the bridges 3 were each 10 μm, in the same manner as in the conventional example. The width z of the slit 4 was 8 μm, in the same manner as in the conventional example. The offset amount x was 5 μm in Examples 1 and 4, 10 μm in Examples 2 and 5, and 14.25 μm in Examples 3 and 6.

Pictures showing orientations of panels that were produced in the present testing are shown in FIGS. 13(a), 13(b), and 13(c) as a result of the testing.

In the case of the conventional example, the orientational central axis formed on the bridge 3 shifted randomly, as shown in FIG. 13(a). In the case in which the bridge 3 was shifted off the center as shown in FIGS. 13(b) and 13(c), the orientational central axis was formed at an end section in a direction opposite to the direction in which the bridge 3 was shifted. In regard to the orientation of the orientational central axis on the bridge 3, the orientational central axis of the liquid crystal molecules 21 tended to move toward an energetically-stable direction. Accordingly, the orientational central axis always shifted to an end section opposite to the end to which the bridge 3 was shifted. This occurred in every subpixel electrode 2a. There was no exception.

As a result of the testing, it was confirmed that the orientational central axis was formed in a substantially central part of the bridge 3 in the case in which either the width of the bridge 3 was narrower than the conventional, or the width of the slit 4 was wider than the conventional designs.

The following describes what were found as a result of the testing in regard to [Display Quality], [Optical Characteristic], [V-T Characteristic Evaluation], [Contrast Viewing Angle Characteristic], [Orientation Characteristic], and [V-T Characteristic in Oblique Viewing].

[Display Quality]

As indicated in Table 1 above, it was found that it was effective with respect to graininess to shift the bridge 3 to some extent. Specifically, the offset amount of 5 μm to 10 μm was suitable. Graininess implies a phenomenon of overall grainy display or unevenness, which phenomenon occurs because the orientational central axes of the liquid crystal molecules 21 in the vicinity of the bridge 3 each point in various directions, and therefore this section tilts in a different direction from other sections.

Further, since the orientational central axes shifted only toward a single end of the bridge 3, the level was slightly inferior with the offset amount of 14.25 μm. The reason why this occurred has not been found out, yet.

In regard to burn-in, tendencies thereof were the same as those of graininess. It was found that no burn-in occurred if the orientational central axes were shifted in a single uniform direction. The burn-in implies a phenomenon in which an anterior display pattern remains when, for example, a screen is switched to a solid display.

In regard to the afterimage period, an afterimage was recognized when the offset amount of the bridge 3 was less than 5 μm. Specifically, as the offset amount increased, the period in which an afterimage was recognized tended to shorten. This is considered to occur because the orientational central axes of the liquid crystal molecules 21, which axes were formed on the bridge 3, shifted in a shorter period of time.

Lastly, the following describes how the afterimages occur in a conventionally-designed liquid crystal display device. First, the orientational central axis of the liquid crystal molecules 21 arose at a center of the bridge 3 at the moment when voltage was applied to the liquid crystal layer 20. However, since the liquid crystal molecules 21 in the other sections had already tilted, the orientational central axis of the liquid crystal molecules 21 at the center of the bridge 3 came to shift in either direction as a result of impact given by the surroundings. Consequently, images appear as afterimages before and after this change.

[Optical Characteristic]

The following discusses results of testing on optical characteristics (transmissivity, contrast) of the liquid crystal panel as a trial product. Table 2 shows: CR ratios and CR Ref ratios, which are proportions of the CR ratios with respect to the conventional example, at the time when the liquid crystal panel on which this evaluation was carried out was turned on; CR ratios and CR Ref ratios, which are proportions of the CR ratios with respect to the conventional example, at the time ten minutes after the liquid crystal panel on which this evaluation was carried out was turned on; white transmissivities; and T Ref ratios, which are proportions of the white transmissivities with respect to the conventional example. Note that the transmissivities are not the exact values, as no evaluation with a formal backlight was carried out.

As shown in Table 2, it was found that the white transmissivity fell at a greater rate under the condition in which the bridge 3 was moved to the end of the subpixel electrode 2a (Examples 3 and 6) than any other conditions. This was considered to occur because the bridge 3 serving as a transmitting area overlapped GE branches, so that the substantial open area ratio decreased.

TABLE 2

| DETAILS OF TESTING | | BRIDGE OFFSET DEPENDENCY WITH ALL PIXELS SHIFTED RIGHTWARD | | | | BRIDGE OFFSET DEPENDENCY WITH ARRANGEMENT IN CHECKERED PATTERN | | | |
|---|---|---|---|---|---|---|---|---|---|
| | | Ref1 | EXAMPLE 1 | EXAMPLE 2 | EXAMPLE 3 | Ref2 | EXAMPLE 4 | EXAMPLE 5 | EXAMPLE 6 |
| BRIDGE OFFSET AMOUNT | | 0.0 | 5.0 | 10.0 | 14.25 | 0.0 | 5.0 | 10.0 | 14.25 |
| SLIT WIDTH | | 8.0 | 8.0 | 8.0 | 8.0 | 8.0 | 8.0 | 8.0 | 8.0 |
| AT THE TIME WHEN PANEL WAS TURNED ON | CR RATIO | 313 | 322 | 336 | 340 | 365 | 369 | 365 | 361 |
| | PROPORTION OF CR TO Ref | — | 102.9% | 107.3% | 108.9% | — | 101.0% | 99.9% | 98.8% |
| 10 MIN. AFTER PANEL WAS TURNED ON | CR RATIO | 319 | 322 | 339 | 356 | 379 | 372 | 388 | 381 |
| | PROPORTION OF CR TO Ref | — | 101.1% | 106.3% | 111.7% | — | 98.2% | 102.5% | 100.6% |
| WHITE TRANSMISSIVITY *1 | | 4.07% | 3.99% | 4.05% | 3.96% | 4.23% | 4.23% | 4.21% | 4.15% |
| PROPORTION OF WHITE TRANSMISSIVITY TO Ref | | — | 98.1% | 99.6% | 97.3% | — | 100.0% | 99.7% | 98.1% |

[V-T Characteristic Evaluation]

FIG. 14(a) shows front V (voltage)-T (luminance) characteristics in the case in which the bridges 3 are shifted leftward with respect to all pixel electrodes 2 (Examples 1 to 3). FIG. 14(b) shows front V-T characteristics in the case in which the bridges 3 are disposed in checkered pattern (Examples 4 to 6). FIGS. 14(a) and 14(b) are both standardized with a luminance of a white voltage (3.9 V). It is understandable from FIGS. 14(a) and 14(b) that there was no change in transmissivity in Examples 1 to 6, compared with the conventional example.

[Contrast Viewing Angle Characteristic]

FIGS. 15(a), 15(b), and 15(c) show viewing angle characteristics of contrast between black and white. The testing thereof was carried out under the following two limited conditions: Example 2 (with the bridge 3 shifted by 10 μm rightward from all pixels); and Example 5 (with the bridge 3 shifted by 10 μm and an arrangement in checkered pattern).

As shown in FIGS. 15(a), 15(b), and 15(c), it was found that viewing angle characteristics of a contrast between black and white were no different from those of the conventional example. Specifically, as shown in FIG. 15(d), Examples 2 and 5 exhibited little difference from the conventional example as a result of examination on the polar angle with which the CR (contrast) viewing angle became 10 or greater. It was found therefrom that characteristic deviations concerned were exhibited only little when the bridge 3 was shifted off.

[Orientation Characteristic (Direction of Three O'Clock to Nine O'Clock)]

Viewing angle orientation characteristics (difference in luminance due to the angle of direction) of full-white display and gradation display (driving voltage: 2.8 V) in the angle of direction of three o'clock to nine o'clock were examined. As a result, very little difference was observed in the full-white display, and no significant difference was observed in the gradation display on the luminance basis, although these are not illustrated. Further, comparison based on a transmissivity obtained as a result of a division by a backlight luminance indicated that Example 2 (with the bridge 3 shifted by 10 μm rightward from all pixels) exhibited characteristics similar to those of the conventional example.

[V-T Characteristic in Oblique Viewing]

V-T characteristics were evaluated with the polar angle changed from 0° (front) to 70°, starting from the three o'clock direction and from the nine o'clock direction of the liquid crystal panel.

As a result, little difference was exhibited in V-T characteristics of any one of the liquid crystal layers up to the polar angle of 50°. Difference was exhibited with the polar angle of 60°. Note that those are not illustrated. Further, it was found that, with the polar angle of 60°, Example 2 exhibited characteristics closer to those of the conventional example.

Accordingly, it is preferable in the liquid crystal display device of the present invention that the connecting electrode be provided one for each space between the subpixel electrodes, and that the connecting electrode be provided in such a manner that a center line of the subpixel electrodes in a direction parallel to a line connecting the subpixel electrodes does not match a center line of the connecting electrode in the direction parallel to the line connecting the subpixel electrodes.

Further, it is preferable in the method for manufacturing the liquid crystal display device in accordance with the present invention that the connecting electrode be provided one for each space between the subpixel electrodes, and that the connecting electrode be provided in such a manner that a center line of the subpixel electrodes in a direction parallel to a line connecting the subpixel electrodes does not match a center line of the connecting electrode in the direction parallel to the line connecting the subpixel electrodes.

According to this invention, the connecting electrode is provided one for each space between the subpixel electrodes. Thus, if the connecting electrode is disposed in such a manner that a center line of the subpixel electrodes in a direction parallel to a line connecting the subpixel electrodes does not match a center line of the connecting electrode in the direction parallel to the line connecting the subpixel electrodes. In other words, an orientational singular point deviates from the center line of the subpixel electrodes.

The foregoing makes it possible to provide the liquid crystal display device of the vertically aligned system and the method of producing the liquid crystal display device, by which deterioration in display quality, such as graininess, burn-in, afterimages and the like, that occurs owing to orientational disorder of the liquid crystal molecules due to the connecting electrodes that connect the subpixel electrodes are preventable.

Further, it is preferable in the liquid crystal display device of the present invention that a protruded section protruding toward a liquid crystal layer be formed in an opposed electrode, facing each of the subpixel electrodes, in such a manner that the protruded section protruding toward the liquid crystal layer faces a center of that each of the subpixel electrodes, and that, when voltage is applied, the liquid crystal molecules tilt axially symmetrically to an orientational central axis perpendicular to a surface of the subpixel electrodes, which orientational central axis is formed in a liquid crystal layer below the protruded section protruding toward the liquid crystal layer.

This makes it possible to prevent deterioration in display quality, such as burn-in, afterimages and the like, that is caused owing to orientational disorder of the liquid crystal molecules due to the connecting electrodes that connect the subpixel electrodes, in the liquid crystal display devices of the vertically aligned system, in which the protruded section protruding toward the liquid crystal layers are formed in the respective opposed electrodes such that the protruded section protruding toward the liquid crystal layers face the respective central parts of the subpixel electrodes.

Further, it is preferable in the liquid crystal display device of the present invention that the connecting electrode be formed in a layer in which the subpixel electrodes are formed.

This makes it possible to prevent deterioration in display quality, such as graininess, burn-in, afterimages and the like, that is caused owing to orientational disorder of the liquid crystal molecules due to the connecting electrodes that connect the subpixel electrodes, in the liquid crystal display devices of the vertically aligned system having the connecting electrodes formed in a layer in which the subpixel electrodes are formed.

Further, it is preferable in the liquid crystal display device of the present invention that the connecting electrode be disposed in such a manner that center lines of all of the connecting electrodes shift in a same direction from center lines of the subpixel electrodes in all of the pixel electrodes of the liquid crystal panel.

With this arrangement, the center lines of the connecting electrodes tilt in the same direction with respect to all pixel electrodes of the liquid crystal panel. Therefore, there occurs no orientational disorder of the liquid crystal molecules. It thus becomes possible to prevent deterioration in display quality, such as graininess, burn-in, afterimages and the like, that is caused owing to orientational disorder of the liquid crystal molecules.

Further, it is preferable in the liquid crystal display device of the present invention that the connecting electrode is disposed in such a manner that center lines of the connecting electrodes shift, from center lines of the subpixel electrodes, in opposite directions among adjacent subpixel electrodes.

With this invention, the center lines of the connecting electrodes shift in a regular manner from all of the pixel electrodes of the liquid crystal panel, producing a so-called checkered pattern. This makes it possible to prevent deterioration in display quality, such as graininess, burn-in, afterimages and the like, that is caused owing to orientational disorder of the liquid crystal molecules, when the liquid crystal panel is viewed from any direction.

Further, it is preferable in the liquid crystal display device of the present invention that three or more subpixel electrodes be disposed in a single line, and that the connecting electrode be disposed in such a manner that center lines of the connecting electrodes shift, from center lines of the subpixel electrodes, in opposite directions among adjacent subpixel electrodes.

This makes it possible to prevent deterioration in display quality, such as graininess, burn-in, afterimages and the like, that is caused owing to orientational disorder of the liquid crystal molecules in the liquid crystal display devices of the vertically aligned system, in which three or more subpixel electrodes discussed above are disposed in a single line, when the liquid crystal panel is viewed from any direction.

Further, it is preferable in the liquid crystal display device of the present invention that plural subpixel electrodes be disposed in matrix, and that the connecting electrode be disposed in such a manner that center lines of the connecting electrodes shift, from center lines of the subpixel electrodes, in opposite directions among adjacent subpixel electrodes.

This makes it possible to prevent deterioration in display quality, such as graininess, burn-in, afterimages and the like, that is caused owing to orientational disorder of the liquid crystal molecules in the liquid crystal display devices of the vertically aligned system having the subpixel electrodes disposed in matrix, when the liquid crystal panel is viewed from any direction.

Further, it is preferable in the liquid crystal display device of the present invention that each of the subpixel electrodes and the connecting electrode be constituted of a transmitting electrode.

This makes it possible to prevent deterioration in display quality, such as graininess, burn-in, afterimages and the like, that is caused owing to orientational disorder of the liquid crystal molecules in the transmissive liquid crystal display devices of the vertically aligned system.

Further, it is preferable in the liquid crystal display device of the present invention that each of the subpixel electrodes and the connecting electrode be constituted of a reflecting electrode.

This makes it possible to prevent deterioration in display quality, such as graininess, burn-in, afterimages and the like, that is caused owing to orientational disorder of the liquid crystal molecules in the reflective liquid crystal display devices of the vertically aligned system.

Further, it is preferable in the liquid crystal display device of the present invention that the plural subpixel electrodes be constituted of a transmitting electrode and a reflecting electrode.

This makes it possible to prevent deterioration in display quality, such as unevenness, graininess, and afterimages, that is caused owing to orientational disorder of the liquid crystal molecules of the transflective liquid crystal display devices of the vertically aligned system.

Further, it is preferable in the liquid crystal display device of the present invention that a metal electrode that is a layer different from the connecting electrode be provided on the connecting electrode, and that a center line of the metal electrode match a center line of the connecting electrode.

This makes it possible to prevent deterioration in display quality, such as graininess, burn-in, afterimages and the like that is caused owing to orientational disorder of the liquid crystal molecules in the transflective liquid crystal display devices of the vertically aligned system, in which the metal reflecting electrodes are provided on the connecting electrodes.

Further, it is preferable in the liquid crystal display device of the present invention that a metal reflecting electrode for a pixel electrode be provided on each of the subpixel electrodes, and that the metal electrode provided on the connecting electrode be formed in a layer in which the reflecting electrode is formed.

This makes it possible to form the metal electrode provided on the connecting electrode, when the reflecting electrode that is to serve as the pixel electrode is formed. Thus, no additional process of forming the metal electrode provided on the connecting electrode becomes necessitated.

Further, it is preferable in the liquid crystal display device of the present invention that a different electrode constituted of a layer different from the pixel electrode be provided in a part of a space between the subpixel electrodes in a pixel, and that the connecting electrode be disposed so as to cover a surface of the different electrode.

Further, it is preferable in the liquid crystal display device of the present invention that a different electrode constituted of a layer different from the pixel electrode be provided in a part of a space between the subpixel electrodes in a pixel, and that the connecting electrode be disposed so as to cover a part of a surface of the different electrode.

Thus, when the metal electrode different from the subpixel electrode is provided in, for example, a lower layer of the subpixel electrodes between the subpixels, the connecting electrode is disposed either in an area where the metal electrode is present to cover the metal electrode, or in the vicinity of the metal electrode.

The foregoing makes it possible to prevent deterioration in display quality, such as graininess, burn-in, afterimages and the like, that is caused owing to orientational disorder of the liquid crystal molecules in the liquid display devices of the vertically aligned system, in which an electrode different from the subpixel electrodes is provided in, for example, the lower layer of the subpixel electrodes.

Further, it is preferable in the liquid crystal display device of the present invention that the amount of eccentricity of a center line of the connecting electrode from a center line of the subpixel electrodes be 5 μm or more.

This makes it possible to reliably prevent deterioration in display quality, such as graininess, burn-in, afterimages and the like, that is caused owing to orientational disorder of the liquid crystal molecules.

INDUSTRIAL APPLICABILITY

The present invention is applicable to liquid crystal display device of a vertically aligned system, including a liquid crystal panel having a pixel electrode constituted of a combination of at least two subpixel electrodes connected together via a connecting electrode narrower than either one of the subpixel electrodes, and liquid crystal molecules tilting, when voltage is applied, axially symmetrically to a predetermined orientational central axis perpendicular to a surface of the subpixel electrodes. The present invention also relates to a method of producing the liquid crystal display device.

The invention claimed is:

1. A liquid crystal display device of a vertically aligned system, comprising:
a liquid crystal panel having a pixel electrode constituted of a combination of at least two subpixel electrodes connected to each other or one another via a connecting electrode narrower than either one of the subpixel electrodes, and liquid crystal molecules tilting, when voltage is applied, axially symmetrically to an orientational central axis perpendicular to a surface of the subpixel electrodes,
the pixel electrode having a first and a second slit formed by the connecting electrode dividing space between the subpixel electrodes,
the first slit differing from the second slit in length, wherein:
three or more subpixel electrodes are disposed in a single line; and
the connecting electrode is disposed in such a manner that center lines of the connecting electrodes shift, from center lines of the subpixel electrodes, in opposite directions among adjacent subpixel electrodes.

2. A liquid crystal display device of a vertically aligned system, comprising:
a liquid crystal panel having a pixel electrode constituted of a combination of at least two subpixel electrodes connected to each other or one another via a connecting electrode narrower than either one of the subpixel electrodes, and liquid crystal molecules tilting, when voltage is applied, axially symmetrically to an orientational central axis perpendicular to a surface of the subpixel electrodes,
the connecting electrode being disposed asymmetrically to the subpixel electrodes, wherein:
four subpixel electrodes disposed in matrix, each of the four subpixel electrodes in the matrix being connected to another two subpixel electrodes via the connecting electrode; and
the connecting electrode is disposed in such a manner that center lines of the connecting electrodes shift, from center lines of the subpixel electrodes, in opposite directions among adjacent subpixel electrodes.

3. A liquid crystal display device of a vertically aligned system, comprising:
a liquid crystal panel having a pixel electrode constituted of a combination of at least two subpixel electrodes connected to each other or one another via a connecting electrode narrower than either one of the subpixel electrodes, and liquid crystal molecules tilting, when voltage is applied, axially symmetrically to an orientational central axis perpendicular to a surface of the subpixel electrodes,
the pixel electrode having a first and a second slit formed by the connecting electrode dividing space between the subpixel electrodes,
the first slit differing from the second slit in length, wherein:
a plurality of the pixel electrodes is disposed in a matrix; and
in each pixel electrode, a center line of the connecting electrode parallel to a line connecting the subpixel electrodes with each other shifts, from center lines of the subpixel electrodes parallel to the line connecting the subpixel electrodes with each other, perpendicular to the line connecting the subpixel electrodes with each other; and
the connecting electrode of each one of the plurality of the pixel electrodes shifts in a different direction from directions in which the connecting electrodes of those of the plurality of the pixel electrode which are disposed on the right, left, top, and bottom of that one of the plurality of the pixel electrodes shift.

* * * * *